United States Patent [19]
Komiya et al.

[11] Patent Number: 5,589,564
[45] Date of Patent: Dec. 31, 1996

[54] WIRE-WETTING FALL POLYMONIZATION PROCESS FOR THE PRODUCTION OF POLYCARBONATES

[75] Inventors: Kyosuke Komiya, Kurashiki; Yoshifumi Kawakami, Fuji; Hiroshige Okamoto, Okayama, all of Japan

[73] Assignee: Asahi Kasei Kogyo Kabushiki Kaisha, Osaka, Japan

[21] Appl. No.: 595,081

[22] Filed: Feb. 1, 1996

Related U.S. Application Data

[63] Continuation-in-part of Ser. No. 530,274, Sep. 1, 1995.

[30] Foreign Application Priority Data

Jul. 23, 1993 [JP] Japan ................................. 5-182896

[51] Int. Cl.$^6$ ................................................ C08G 64/00
[52] U.S. Cl. ................................ 528/196; 526/62; 526/64; 526/65; 526/67; 528/198
[58] Field of Search .......................... 528/196, 198; 526/62, 64, 65, 67

[56] References Cited

U.S. PATENT DOCUMENTS

| | | | |
|---|---|---|---|
| 2,719,776 | 10/1955 | Kummei | 18/54 |
| 3,110,547 | 11/1963 | Emmert | 264/211.17 |
| 3,888,826 | 6/1975 | Yamana | 260/47 X |

FOREIGN PATENT DOCUMENTS

| | | | |
|---|---|---|---|
| 0529093A1 | 3/1991 | European Pat. Off. | C08G 64/30 |
| 2235150 | 6/1974 | France | C08G 63/62 |
| 1118967 | 12/1961 | Germany. | |
| 2041122 | 3/1972 | Germany | C08G 17/003 |
| 48-8355 | 3/1973 | Japan. | |
| 50-19600 | 7/1975 | Japan. | |
| 53-17569 | 2/1978 | Japan. | |
| 53-5718 | 3/1978 | Japan. | |
| 2-153923 | 6/1990 | Japan. | |
| 4-58806 | 8/1992 | Japan. | |
| 1007302 | 10/1965 | United Kingdom. | |

OTHER PUBLICATIONS

Database WPI, Derwent Publichations Ltd., London, Great Britain; AN 85–096298(16) & JP–A–60 044 527 (Toyobo KK), 1985.

Database WPI, Derwent Publications Ltd., London, Great Britain; AN 78–24393a(13) & JP–A–53 017 569 (Mitsubishi Chem Ind), 1978.

*Primary Examiner*—Terressa Mosley
*Attorney, Agent, or Firm*—Jacobson, Price, Holman & Stern, PLLC

[57] ABSTRACT

A method for producing an aromatic polycarbonate comprises feeding to a feeding zone (having a foraminous plate) at least one polymerizing material selected from the group consisting of a) a molten monomer mixture of an aromatic dihydroxy compound and a diaryl carbonate, and b) a molten prepolymer obtained by a process comprising reacting an aromatic dihydroxy compound with a diaryl carbonate, and allowing the polymerizing material to pass downwardly through the foraminous plate and fall along and in contact with a wire through a wire-wetting fall polymerization reaction zone, thereby effecting polymerization of the polymerizing material during the wire-wetting fall thereof. Colorless and high quality aromatic polycarbonates are thus stably produced at a high polymerization rate for a prolonged period of time, using an apparatus which has excellent sealing properties under high vacuum and maintenance of which is easy.

16 Claims, 9 Drawing Sheets

WIRE-WETTING FALL POLYMONIZATION PROCESS FOR THE PRODUCTION OF POLYCARBONATES

This application is a continuation-in-part of U.S. patent application Ser. No. 08/530,274 filed on Sep. 1, 1995, pending.

BACKGROUND OF THE INVENTION

1. Field of the Invention

The present invention relates to a method for producing an aromatic polycarbonate. More particularly, the present invention is concerned with a novel method for producing an aromatic polycarbonate, which comprises feeding, to a feeding zone having a foraminous plate, a molten monomer mixture of an aromatic dihydroxy compound and a diaryl carbonate and/or a molten prepolymer obtained by a process comprising reacting an aromatic dihydroxy compound with a diaryl carbonate, wherein the foraminous plate has at least one hole, and the feeding zone communicates, through the hole, with a polymerization zone comprising a wire-wetting fall polymerization reaction zone having at least one wire in correspondence with the hole, the wire being securely held at one end thereof in an upper end portion of the wire-wetting fall polymerization reaction zone and extending downwardly through the wire-wetting fall polymerization reaction zone; and allowing the monomer mixture and/or the prepolymer to pass downwardly through the foraminous plate and fall along and in contact with the wire through a wire-wetting fall polymerization reaction zone, thereby effecting a polymerization of the monomer mixture and/or the prepolymer during the wire-wetting fall.

2. Discussion of Related Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities, such as sodium chloride, and residual methylene chloride, which adversely affect properties of a produced polymer.

With respect to a method for producing an aromatic polycarbonate from an aromatic dihydroxy compound and a diaryl carbonate, in a conventionally known melt polycondensation process, a polycarbonate is produced by performing an ester exchange reaction between bisphenol A and diphenyl carbonate in the molten state, while removing a by-produced phenolic compound (phenol). Unlike the interfacial polycondensation process, the melt polycondensation process has an advantage in that a solvent need not be used. However, the melt polycondensation process has a serious problem, namely; since the viscosity of polymer being formed increases during the progress of the polymerization reaction, it becomes difficult to remove by-produced phenol from the polymerization reaction system efficiently, thus making it difficult to achieve a high degree of polymerization with respect to polycarbonate produced.

Various polymerizers have been known for use in producing aromatic polycarbonates. An agitation type polymerizer vessel equipped with an agitator is widely used. The agitation type polymerizer vessel equipped with an agitator is advantageous in that it exhibits high volumetric efficiency and has a simple construction, so that polymerization on a small scale can be efficiently carried out. However, the agitation type polymerization vessel has a problem in that, as mentioned above, the by-produced phenol becomes difficult to remove from the polymerization reaction system efficiently in the production of aromatic polycarbonates on a commercial scale, so that it is difficult to achieve a high polymerization rate.

Specifically, a large-scale agitation type polymerizer vessel generally has a greater ratio of liquid volume to vaporization area than a small-scale one. In other words, the depth of a reaction mixture in the polymerizer is large. In such a case, even if the degree of vacuum of the polymerization reaction zone is raised in order to achieve a high degree of polymerization in the lower part of the agitation vessel, the polymerization proceeds under virtually high pressure due to the weight of the reaction mixture, so that phenol and the like cannot be efficiently removed.

To solve the above-mentioned problem, various attempts have been made to remove phenol and the like from high viscosity polymer being formed. For example, Examined Japanese Patent Application Publication No. 50-19600 (corresponding to GB-1007302) discloses the use of a screw type polymerizer having a vent. Examined Japanese Patent Application Publication No. 53-5718 (corresponding to U.S. Pat. No. 3,888,826) describes a thin film evaporation type reactor, such as a screw evaporator and a centrifugal film evaporator. Further, Unexamined Japanese Patent Application Laid-Open Specification No. 2-153923 discloses a method in which a combination of a thin film evaporation type apparatus and a horizontal stirring polymerizer vessel is used. These polymerizers, including an agitation type polymerizer vessel, have a common drawback in that they have a rotary driving part in the main body, which rotary driving part cannot be completely sealed, so that when the polymerization is conducted under high vacuum, a small amount of oxygen inevitably leaks into the reaction system, leading to discoloration of the final polymer. When a sealant is used to prevent the leak-in of oxygen into the reaction system, the sealant unavoidably gets mixed into the final polymer, so that the quality of the final polymer is lowered. These polymerizers also have a serious maintenance problem in that, even if the seal effect is high at the beginning of the operation of the polymerizer, the seal effect is inevitably lowered during the continuous operation for a prolonged period of time.

A fall polymerization process, in which polymerizing material is allowed to pass downwardly through a perforated plate and fall, so that polymerization of the polymerizing material is effected during the fall (in this process there is no need of using a polymerizer having a rotary driving part in a main body thereof), is known as a method for producing resins other than aromatic polycarbonates. For example, U.S. Pat. No. 3,110,547 discloses a method for producing a polyester having a desired molecular weight, in which a polyester having a low degree of polymerization is allowed to fall in the form of filaments through a vacuum zone. In the technique of this U.S. Patent, since recirculation of the fallen polymer and repetition of the fall causes a lowering of the quality of the final polyester, the polymerization is finished upon one-time fall without recirculation. However, with respect to such a method, many drawbacks have been pointed out. For example, concerning a method of spinning a polyester having a low degree of polymerization through a spinneret into a vacuum zone to effect polycondensation thereof, Examined Japanese Patent Application Publication No. 48-8355 contains a description such that when polymerizing material (not having a satisfactorily high spinnability) is fed into a reactor, filaments being polymerized are likely to be broken, so that the quality of the polycondensate is drastically lowered. Low molecular weight polycondensate scattering from the filaments sticks to the surface of the spinneret to smudge the spinneret and, hence, it becomes difficult for the filaments to fall straight down through the spinneret, so that the filaments are caused to contact one another to bring about breakage of the filaments or are caused to join one another, thus hindering the polymerization reaction. Further, observation windows easily get clouded and, hence, observation becomes difficult, so that an observer has difficulty in ascertaining an appropriate time for the replacement of smudged spinnerets with fresh ones. In the above Japanese patent document, it is further described that, for the above reasons, when producing a polyester and a polyamide, it is preferred to employ a fall process in which a polymer having a low degree of polymerization is allowed to flow down along and in contact with a porous material arranged vertically in a reaction vessel. However, the above Japanese patent document contains no description about aromatic polycarbonates.

Aside from a polymerization method, with respect to a method for removing a residual monomer from polymerization products, U.S. Pat. No. 2,719,776 proposes a process of spinning a lactam polymerization product, which comprises allowing the product to pass through a perforated plate and fall in the form of filaments, whereby the residual monomer is removed by evaporation. However, many disadvantages accompanying this method have been pointed out. For example, Unexamined Japanese Patent Application Laid-Open Specification No. 53-17569 points out that the method of U.S. Pat. No. 2,719,776 has various disadvantages. That is, in the method of the above-mentioned U.S. Patent, when the evaporation of the volatiles is small, filaments can be formed, whereas when the evaporation of the volatiles is large, filaments unfavorably suffer foaming, making it difficult to carry out the monomer-removing operation smoothly. Further, this method can be applied only to a polymerization product having a viscosity in a relatively narrow range suitable for forming filaments. Moreover, in this method, when an inert gas is introduced into the column in which this method is practiced, filaments are caused to contact and join one another due to the turbulence of the flow of inert gas. To solve such disadvantages, Unexamined Japanese Patent Application Laid-Open Specification No. 53-17569 proposes a fall process which comprises providing a linear support arranged vertically, and allowing a high viscosity material to pass through a perforated plate or spinneret and fall along and in contact with the linear support. This Japanese patent document proposes this fall process as a method for producing polyesters, such as polyethylene terephthalate and polybutylene terephthalate, and polyamides, such as nylon 6 and nylon 66. However, in this Japanese patent document, there is no mention of aromatic polycarbonates. Further, the Japanese patent document does not contain any description about measures for solving the problem of the smudge of the spinneret which also often occurs when a polyester or a polyamide is allowed to pass through the spinneret and fall along and in contact with the linear support.

Examined Japanese Patent Application Publication No. 4-58806 describes a process for producing a polyester by the polycondensation of bis-(β-hydroxy alkyl) terephthate, in which an early stage polycondensate is allowed to fall along and in contact with a linear support hung vertically from a spinneret in an inert gas atmosphere, thereby performing further polymerization of the polycondensate. This Japanese patent document does not mention any measure for solving the problem of the smudge of the spinneret which takes place during the operation of such a process. Further, this patent document is also silent about aromatic polycarbonates. This silence about aromatic polycarbonate can be understood from the fact that even if an attempt is made to produce a polycarbonate by replicating working examples of this patent document under same conditions as described therein, not only does a polymer obtained suffer discoloration, but also the spinneret is likely to be smudged. Then, not only does it become impossible to perform a continuous operation for a long time, but also a polycarbonate of high quality cannot be produced. This fact clearly shows that the method or process preferably used for the production of a polyester is not always applicable to the production of a polycarbonate.

As is apparent from the above, a polymerization method comprising allowing a polymerizing material to pass through a perforated plate or a spinneret and fall in the form of filaments or comprising allowing a polymerizing material to pass through a perforated plate or a spinneret and fall along and in contact with a linear support, has been known for the production of a polyester and a polyamide, but not known for the production of an aromatic polycarbonate at-all.

SUMMARY OF THE INVENTION

The present inventors have extensive and intensive studies with a view toward solving the above-mentioned problems of the prior art.

As a result, it has unexpectedly been found that by adopting a wire-wetting fall polymerization method in which a polymerizing material is allowed to pass downwardly through a foraminous plate and fall along and in contact with a wire through a wire-wetting fall polymerization zone, the object of the present invention can be attained.

It is, therefore, a primary object of the present invention to provide a melt polycondensation process for producing a colorless and high quality aromatic polycarbonate at a high polymerization rate and stably for a prolonged period of time, using an apparatus which is excellently sealed under high vacuum conditions, and is easy to maintain.

The foregoing and other objects, features and advantages of the present invention will become apparent from the following detailed description and appended claims taken in connection with the accompanying drawings.

Figure 1:
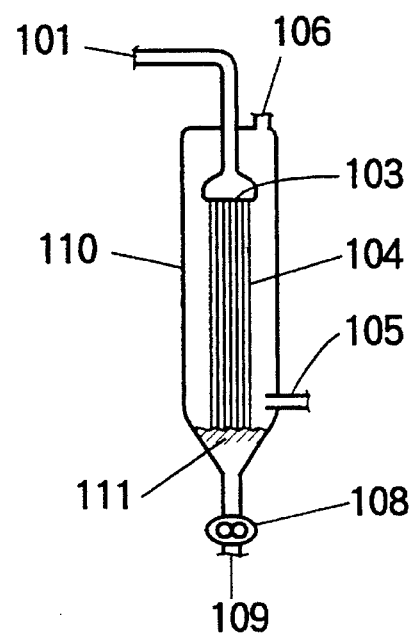
FIGS. 1 and 2 respectively show two forms of wire-wetting fall polymerization apparatus usable in the present invention.

DESCRIPTION OF REFERENCE NUMERALS (FIGS. 1 and 2)
101: Inlet for a polymerizing material
102: Recirculation line
103: Foraminous plate
104: Wire
105: Gas feed port
106: Vent
107: Recirculation pump
108: Discharge pump
109: Outlet
110: Main body of wire-wetting fall polymerizer
111: Molten polymer
(FIG. 3)
201–211: Numerals assigned in connection with free-fall polymerizer
101A–111A: Numerals assigned in connection with first wire-wetting fall polymerizer
101B–111B: Numerals assigned in connection with second wire-wetting fall polymerizer
  201: Inlet for a starting material
  101A, 101B: Inlet for a polymerizing material
  202, 102A, 102B: Recirculation line
  203: Perforated plate
  103A, 103B: Foraminous plate
  204: Molten monomer mixture or prepolymer in the form of a film, a filament, a droplet or a spray
  104A, 104B: Wire
  205, 105A, 105B: Gas-feed port
  206, 106A, 106B: Vent
  207, 107A, 107B: Recirculation pump
  208, 108A: Transfer pump
  108B: Discharge pump
  209, 109A, 109B: Outlet
  210: Main body of free-fall polymerizer
  211, 111A: Molten prepolymer
  110A, 110B: Main body of wire-wetting fall polymerizer
  111B: Molten polymer
(FIG. 4)
301A–306A: Numerals assigned in connection with first vertical agitation type polymerizer vessel (A)
301B–306B: Numerals assigned in connection with first vertical agitation type polymerizer vessel (B)
301C–307C: Numerals assigned in connection with second vertical agitation type polymerizer vessel (C)
101A–111A: Numerals assigned in connection with first wire-wetting fall polymerizer
101B–111B: Numerals assigned in connection with second wire-wetting fall polymerizer
  301A, 301B: Inlet for a starting material
  301C: Inlet for a prepolymer
  302A, 302B, 302C: Vent
  303A, 303B: First vertical agitation type polymerizer vessels (A) and (B)
  303C: Second vertical agitation type polymerizer vessel (C)
  304A, 304B, 304C: Molten prepolymer
  305A, 305B, 305C: Outlet
  306A, 306B, 306C: Agitator
  307C, 309: Transfer pump
  101A, 101B: Inlet for a polymerizing material
  102A: Recirculation line
  103A, 103B: Foraminous plate
  104A, 104B: Wire
  105A, 105B: Gas feed port
  106A, 106B: Vent
  107A: Recirculation pump
  108A: Transfer pump
  108B: Discharge pump
  109A, 109B: Outlet
  110A, 110B: Main body of wire-wetting fall polymerizer
  111A: Molten Prepolymer
  111B: Molten Polymer
(FIG. 5)
401–406: Numerals assigned in connection with horizontal agitation type polymerizer vessel
101–111: Numerals assigned in connection with wire-wetting fall polymerizer
  401: Horizontal agitation type polymerizer vessel
  402: Inlet for a starting material
  403: Vent
  404: Outlet
  405: Transfer pump
  406: Agitator
  101: Inlet for a polymerizing material
  102: Recirculation line
  103: Foraminous plate
  104: Wire
  105: Gas-feed port
  106: Vent
  107: Recirculation pump
  108: Discharge pump
  109: Outlet
  110: Main body of wire-wetting fall polymerizer
  111: Molten polymer
(FIG. 6)
501–511: Numerals assigned in connection with wall-wetting fall polymerizer
101A–111A: Numerals assigned in connection with first wire-wetting fall polymerizer
101B–111B: Numerals assigned in connection with second wire-wetting fall polymerizer
  501: Inlet for a starting material
  502: Recirculation line
  503: Overflow port
  504: Wall-wetting fall polymerizer
  505: Film-like prepolymer
  506: Gas feed port
  507: Vent
  508: Recirculation pump
  509: Molten prepolymer
  510: Transfer pump
  511: Outlet
  101A, 101B: Inlet for a polymerizing material
  102A, 102B: Recirculation line 103A, 103B: Foraminous plate
104A, 104B: Wire
105A, 105B: Gas feed port
106A, 106B: Vent
107A, 107B: Recirculation pump
108A: Transfer pump
108B: Discharge Pump
109A, 109B: Outlet
110A, 110B: Main body of wire-wetting fall polymerizer
111A: Molten Prepolymer
111B: Molten Polymer
(FIG. 7)
301A–306A: Numerals assigned in connection with first vertical agitation type polymerizer vessel (A)
301B–306B: Numerals assigned in connection with first vertical agitation type polymerizer vessel (B)
301C–307C: Numerals assigned in connection with second vertical agitation type polymerizer vessel (C)
201–211: Numerals assigned in connection with free-fall polymerizer
101–111 : Numerals assigned in connection with wire-wetting fall polymerizer
 301A, 301B: Inlet for a starting material
 301c: Inlet for a prepolymer
 302A, 302B, 302C: Vent
 303A, 303B: First vertical agitation type polymerizer vessels (A) and (B)
 303C: Second vertical agitation type polymerizer vessel (C)
 304A, 304B, 304C: Molten prepolymer
 305A, 305B, 305C: Outlet
 306A, 306B, 306C: Agitator
 307C, 309 : Transfer pump
201: Inlet for a prepolymer
101: Inlet for a polymerizing material
202: Recirculation line
203: Perforated plate
103: Forminous plate
204: Molten prepolymer in the form of a film, a filament, a droplet or a spray
104: Wire
205, 105: Gas feed port
206, 106: Vent
207: Recirculation pump
208: Transfer pump
108: Discharge pump
209, 109: Outlet
210: Main body of free-fall polymerizer
110: Main body of wire-wetting fall polymerizer
211: Molten prepolymer
111: Molten polymer
(FIG. 8)
301A–306A: Numerals assigned in connection with first vertical agitation type polymerizer vessel (A)
301B–306B: Numerals assigned in connection with first vertical agitation type polymerizer vessel (B)
301C–307C: Numerals assigned in connection with second vertical agitation type polymerizer vessel (C)
401–406: Numerals assigned in connection with horizontal agitation type polymerizer 101–111: Numerals assigned in connection with wire-wetting fall polymerizer
 301A, 301B: Inlet for a starting material
 301C: Inlet for a prepolymer
 302A, 302B, 302C: Vent
 303A, 303B: First vertical agitation type polymerizer vessels (A) and (B)
 303C: Second vertical agitation type polymerizer vessel (C)
 304A, 304B, 304C: Molten prepolymer
 305A, 305B, 305C: Outlet
 306A, 306B, 306C: Agitator
 307C, 309: Transfer pump
401: Horizontal agitation type polymerizer vessel
402: Inlet
403: Vent
404: Outlet
405: Transfer pump
406: Agitator
101: Inlet for a polymerizing material
103: Foraminous plate
104: Wire
105: Gas feed port
106: Vent
108: Discharge pump
109: Outlet
110: Main body of wire-wetting fall polymerizer
111: Molten polymer
(FIG. 9) p0 301A–306A: Numerals assigned in connection with first vertical agitation type polymerizer vessel (A)
301B–306B: Numerals assigned in connection with first vertical agitation type polymerizer vessel (B)
301C–307C: Numerals assigned in connection with second vertical agitation type polymerizer vessel (C)
501–511: Numerals assigned in connection with wall-wetting fall polymerizer
101A–111A: Numerals assigned in connection with first wire-wetting fall polymerizer
101B–111B: Numerals assigned in connection with second wire-wetting fall polymerizer
 301A, 301B: Inlet for a starting material
 301C: Inlet for a prepolymer
 302A, 302B, 302C: Vent
 303A, 303B: First vertical agitation type polymerizer vessels (A) and (B)
 303C: Second vertical agitation type polymerizer vessel (C)
 304A, 304B, 304C: Molten prepolymer
 305A, 305B, 305C: Outlet
 306A, 306B, 306C: Agitator
 307C, 309: Transfer pump
501: Inlet for a prepolymer
502: Recirculation line
503: Overflow port
504: Wall-wetting fall polymerizer
505: Film-like prepolymer
506: Gas feed port
507: Vent
508: Recirculation pump 509: Molten prepolymer
510: Transfer pump
511: Outlet
101A, 101B: Inlet for a polymerizing material
102A: Recirculation line
103A, 103B: Foraminous plate
104A, 104B: Wire
105A, 105B: Gas feed port
106A, 106B: Vent
107A: Recirculation pump
108A: Transfer pump
108B: Discharge pump
109A, 109B: Outlet
110A, 110B: Main body of wire-wetting fall polymerizer
111A: Molten prepolymer
111B: Molten polymer
(FIGS. 10 to 12)
103: Foraminous plate
104: Wire
121: Hole of a foraminous plate
122: Fixation point of wire
123: Support rod for wire

DETAILED DESCRIPTION OF THE INVENTION

Essentially, according to the present invention, there is provided a novel method for producing an aromatic polycarbonate, which comprises:

feeding, to a feeding zone having a foraminous plate, at least one polymerizing material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, the foraminous plate having at least one hole, the feeding zone communicating, through the at least one hole, with a polymerization zone comprising a wire-wetting fall polymerization reaction zone, the wire-wetting fall polymerization reaction zone having at least one wire in correspondence with the at least one hole, the at least one wire being securely held at one end thereof in an upper end portion of the wire-wetting fall polymerization reaction zone and extending downwardly through the wire-wetting fall polymerization reaction zone, so that the polymerizing material fed to the feeding zone is enabled to pass downwardly through the foraminous plate and fall along and in contact with the at least one wire toward the other end of the at least one wire, and allowing the polymerizing material to pass downwardly through the foraminous plate and fall along and in contact with the at least one wire through a wire-wetting fall polymerization reaction zone, to effect a wire-wetting fall polymerization of the polymerizing material, thereby obtaining a polymer at a bottom of the polymerization zone comprising the wire-wetting fall polymerization reaction zone.

For easy understanding of the present invention, the essential features and various embodiments of the present invention are enumerated below.

1. A method for producing an aromatic polycarbonate, which comprises:

feeding, to a feeding zone having a foraminous plate, at least one polymerizing material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, the foraminous plate having at least one hole, the feeding zone communicating, through the at least one hole, with a polymerization zone comprising a wire-wetting fall polymerization reaction zone, the wire-wetting fall polymerization reaction zone having at least one wire in correspondence with the at least one hole, the at least one wire being securely held at one end thereof in an upper end portion of the wire-wetting fall polymerization reaction zone and extending downwardly through the wire-wetting fall polymerization reaction zone, so that the polymerizing material fed to the feeding zone is enabled to pass downwardly through the foraminous plate and fall along and in contact with the at least one wire toward the other end of the at least one wire, and allowing the polymerizing material to pass downwardly through the foraminous plate and fall along and in contact with the at least one wire through a wire-wetting fall polymerization reaction zone, to effect a wire-wetting fall polymerization of the polymerizing material, thereby obtaining a polymer at a bottom of the polymerization zone comprising the wire-wetting fall polymerization reaction zone.

2. A method according to item 1 above, which further comprises recirculating, to the feeding zone having the foraminous plate, a part or all of the polymer obtained at the bottom of the polymerization zone, and allowing the recirculated polymer to pass downwardly through the foraminous plate and fall along and in contact with the at least one wire through the wire-wetting fall polymerization reaction zone, thereby increasing the degree of polymerization of the recirculated polymer to a predetermined level.

3. A method according to item 1 above, wherein the feeding of the polymerizing material to the feeding zone having the foraminous plate is continuously conducted, and which method further comprises continuously conducting a sequence of steps of recirculating, to the feeding zone having the foraminous plate, a part of the polymer obtained at the bottom of the polymerization zone, and allowing an admixture of the continuously fed polymerizing material and the recirculated polymer to pass downwardly through the foraminous plate and fall along and in contact with the at least one wire through the wire-wetting fall polymerization reaction zone, thereby continuously effecting a wire-wetting fall polymerization of the admixture, while continuously withdrawing the remainder of the polymer obtained at the bottom of the polymerization zone.

4. A method according to item 1 above, wherein the polymerizing material is the molten prepolymer.

5. A method according to item 4 above, wherein the molten prepolymer is a molten second prepolymer which has been obtained by a process selected from the group consisting of:

(a) a free-fall polymerization process comprising introducing, to an introduction zone having a perforated plate, at least one starting material selected from the group consisting of:
- a monomer mixture of an aromatic dihydroxy compound and a diaryl carbonate, and
- a first prepolymer obtained by reacting an aromatic dihydroxy compound with a diaryl carbonate, and allowing the starting material to pass downwardly through the perforated plate and fall freely through a free-fall polymerization reaction zone, thereby effecting a free-fall polymerization of the starting material during the free-fall thereof, (b) an agitation polymerization process comprising agitating at least one starting material in a molten state in an agitation type polymerizer vessel, wherein the starting material is as defined above, thereby effecting an agitation polymerization of the starting material, and (c) a thin film-state polymerization process comprising subjecting at least one starting material in a molten state to a thin film-forming treatment to form a thin film of the starting material, wherein the starting material is as defined above, thereby effecting a thin film-state polymerization of the starting material while allowing the thin film to maintain a thin film-state thereof, and wherein the molten second prepolymer as the polymerizing material is subjected to the wire-wetting fall polymerization to obtain the polymer at the bottom of the polymerization zone.

6. A method according to item 5 above, which further comprises recirculating to the feeding zone a part or all of the polymer obtained at the bottom of the polymerization zone, and allowing the recirculated polymer to pass downwardly through the foraminous plate and fall along and in contact with the at least one wire through the wire-wetting fall polymerization reaction zone, thereby increasing the degree of polymerization of the recirculated polymer to a predetermined level.

7. A method according to item 5 above, wherein, in the wire-wetting fall polymerization of the second prepolymer, the feeding of the second prepolymer to the feeding zone having the foraminous plate is continuously conducted, and which method further comprises continuously conducting a sequence of steps of recirculating to the feeding zone a part of the polymer obtained at the bottom of the polymerization zone, and allowing an admixture of the continuously fed second prepolymer in the molten state and the recirculated polymer to pass downwardly through the foraminous plate and fall along and in contact with the at least one wire through the wire-wetting fall polymerization reaction zone, thereby continuously effecting a wire-wetting fall polymerization of the admixture, while continuously withdrawing the remainder of the polymer obtained at the bottom of the polymerization zone.

8. A method according to item 4 above, wherein the molten prepolymer is a molten third prepolymer which has been obtained by a process selected from the group consisting of:

(d) an agitation and free-fall polymerization process comprising:
agitating a starting material in a molten state in an agitation type polymerizer vessel, the starting material being at least one member selected from the group consisting of:
- a monomer mixture of an aromatic dihydroxy compound and a diaryl carbonate, and
- a first prepolymer obtained by reacting an aromatic dihydroxy compound with a diaryl carbonate, thereby effecting an agitation polymerization of the starting material to obtain a second prepolymer; and
introducing the second prepolymer in a molten state to an introduction zone having a perforated plate, and allowing the second prepolymer to pass downwardly through the perforated plate and fall freely through a free-fall polymerization reaction zone, thereby effecting a free-fall polymerization of the second prepolymer during the free-fall thereof, and (e) an agitation and thin film-state polymerization process comprising:
agitating a starting material in a molten state in an agitation type polymerizer vessel, wherein the starting material is as defined above, thereby effecting an agitation polymerization of the starting material to obtain a second prepolymer; and
subjecting the second prepolymer in a molten state to a thin film-forming treatment to form a thin film of the starting material, wherein the starting material is as defined above, thereby effecting a thin film-state polymerization of the second prepolymer while allowing the thin film to maintain a thin film-state thereof, and
wherein the molten third prepolymer as the polymerizing material is subjected to the wire-wetting fall polymerization to obtain the polymer at the bottom of the polymerization zone.

9. A method according to item 8 above, which further comprises recirculating to the feeding zone a part or all of the polymer obtained at the bottom of the polymerization zone, and allowing the recirculated polymer to pass downwardly through the foraminous plate and fall along and in contact with the at least one wire through the wire-wetting fall polymerization reaction zone, thereby increasing the degree of polymerization of the recirculated polymer to a predetermined level.

10. A method according to item 8 above, wherein, in the wire-wetting fall polymerization of the third prepolymer, the feeding of the third prepolymer to the feeding zone having the foraminous plate is continuously conducted, and which method further comprises continuously conducting a sequence of steps of recirculating to the feeding zone a part of the polymer obtained at the bottom of the polymerization zone, and allowing an admixture of the continuously fed third prepolymer in the molten state and the recirculated polymer to pass downwardly through the foraminous plate and fall along and in contact with the at least one wire through the wire-wetting fall polymerization reaction zone, thereby continuously effecting a wire-wetting fall polymerization of the admixture, while continuously withdrawing the remainder of the polymer obtained at the bottom of the polymerization zone.

11. A method according to item 5 or 8 above, wherein the agitation polymerization of the starting material is effected using at least one member selected from the group consisting of a vertical agitation type polymerizer vessel having agitating elements rotating on a vertically extending axis and a horizontal agitation type polymerizer vessel having agitating elements rotating on a horizontally extending axis.

12. A method according to item 11 above, wherein the agitation polymerization of the starting material is effected using both of the vertical agitation type polymerizer vessel and the horizontal agitation type polymerizer vessel in this order.

13. A method according to any one of items 1 to 10 above, wherein the wire-wetting fall is conducted through a distance of 0.3 m or more.

14. A method according to any one of items 1 to 10 above, wherein the polymerizing material is allowed to pass downwardly through the foraminous plate at a flow rate in the range of from $10^{-2}$ to $10^2$ liters/hr per hole.

15. A method according to item 13 above, wherein the polymerizing material is allowed to pass downwardly through the foraminous plate at a flow rate in the range of from $10^{-2}$ to $10^2$ liters/hr per hole.

16. A method according to any one of items 1 to 10 above, wherein the polymerization zone comprising the wire-wetting fall polymerization reaction zone further comprises a free-fall polymerization reaction zone on at least one side selected from an upstream side and a downstream side relative to the wire-wetting fall polymerization reaction zone in contiguous relationship.

As mentioned above, a number of polymerizers having no rotary driving parts in their respective main bodies are known for use in producing resins other than polycarbonates. In this connection, it should be noted that there is a large difference between the melt polycondensation reaction for producing aromatic polycarbonates and that for producing polyesters and polyamides, so that it is difficult to apply a polymerizer designed for use in producing polyesters and polyamides to the production of aromatic polycarbonates. The major differences between aromatic polycarbonates and both polyesters and polyamides are as follows: First, the melt viscosity, which is an important factor in designing a polymerizer for melt polycondensation of aromatic polycarbonates, is extremely high as compared to that of polyesters and polyamides. Specifically, at the temperatures of polymerization, the melt viscosity of both polyamides and polyesters at a later stage of polymerization is usually from several hundred to several thousand poises and is unlikely to rise to a level of 3000 poises or more, whereas the melt viscosity of aromatic polycarbonates at a later stage of polymerization reaches a level as high as tens of thousands of poises. Second, the melt polycondensations of polyamides, polyesters and aromatic polycarbonates are all equilibrium reactions, but the reactions for these polymers are largely different in equilibrium constant. Generally, the equilibrium constant of the reaction for polyamides is on the order of $10^2$ and that for polyesters is approximately 1, whereas the equilibrium constant of the reaction for aromatic polycarbonates is very small and on the order of $10^{-1}$. The smaller the equilibrium constant, the more difficult the polymerization reaction, so that the reaction does not proceed unless by-products are more efficiently removed from the reaction system. Therefore, in the polymerization of aromatic polycarbonates, the by-products must be removed from the reaction system far more efficiently than in the polymerization of polyamides and polyesters. However, efficient removal of by-products is very difficult in the production of aromatic polycarbonates since aromatic polycarbonates have a very high melt viscosity, as mentioned above.

However, it has surprisingly been found that when a wire-wetting fall polymerization technique is applied to production of aromatic polycarbonates, high quality aromatic polycarbonates can be produced with great advantages, without causing the above-mentioned problems accompanying the operation of fall polymerization of polyamides and polyesters. In other words, by the present invention, high quality aromatic polycarbonates can be stably produced since a polymerizing material which falls along and in contact with a wire does not suffer breakage during the wire-wetting fall, and the quality of the resultant polymer becomes uniform. Namely, since no accumulation of low molecular weight polycondensate occurs on a spinneret, a polymerizing material can be injected, or allowed to fall, straight down without hindrance, and there is no need to halt the operation to replace smudged spinnerets with fresh ones. Therefore, the operation can be stably carried out for a very long period of time.

The reason for such a difference in behavior between the wire-wetting fall polymerization of aromatic polycarbonates and the fall polymerization of polyesters and polyamides has not yet been elucidated. With respect to the reason why spinnerets do not at all suffer from accumulation of a low molecular weight polycondensate, it is presumed that by-produced phenol effectively washes away the low molecular weight polycondensate accumulated on the spinneret during the polymerization of aromatic polycarbonates, fundamentally differing from the polymerization of polyamides polyesters wherein by-products are water and ethylene glycol. Such an advantageous effect of the by-produced phenol on the wire-wetting fall polymerization of aromatic polycarbonates could not be expected from the polymerization of polyesters and polyamides at all.

The wire-wetting fall polymerization method of the present invention using a foraminous plate and a wire does not require a polymerizer which has a rotary driving part which is exposed to a gaseous phase during the reaction, so that, with respect to polymerization apparatus for practicing a wire-wetting fall polymerization method, excellent sealing can be provided even under high vacuum, and maintenance of the apparatus is easy. Furthermore, colorless, transparent and high quality aromatic polycarbonate can be easily produced by the method of the present invention. That is, the method of the present invention for producing an aromatic polycarbonate solves all of the difficult problems mentioned above which accompany conventional methods for melt polycondensation of an aromatic polycarbonate.

Hereinbelow, the present invention will be described in more detail.

In the present invention, the terminology "aromatic dihydroxy compound" means a compound represented by the following formula:

HO—Ar—OH wherein Ar represents a divalent aromatic group.

Preferred examples of divalent aromatic groups as Ar include a group represented by the following formula:

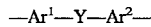

—Ar¹—Y—Ar²— wherein each of Ar¹ and Ar² independently represents a divalent carbocyclic or heterocyclic aromatic group having from 5 to 70 carbon atoms, and Y represents a divalent alkane group having from 1 to 30 carbon atoms.

In divalent aromatic groups as Ar¹ and Ar², at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Illustrative examples of heterocyclic aromatic groups include an aromatic group having at least one hetero atom, such as a nitrogen atom, an oxygen atom or a sulfur atom.

Examples of divalent aromatic groups as Ar¹ and Ar² include an unsubstituted or substituted phenylene group, an unsubstituted or substituted biphenylene group and an unsubstituted or substituted pyridylene group. Substituents for Ar¹ and Ar² are as described above.

Examples of divalent alkane groups as Y include organic groups respectively represented by the following formulae:

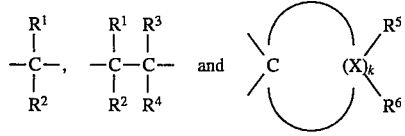

wherein each of R¹, R², R³ and R⁴ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has R⁵ and R⁶ bonded thereto; each R⁵ independently represents a hydrogen atom or an alkyl group having from 1 to 6 carbon atoms, and each R⁶ independently represents a hydrogen atom or an alkyl group having from 1 to 6 carbon atoms, wherein R⁵ and R⁶ are the same or different;

wherein at least one hydrogen atom of each of R¹, R², R³, R⁴, R⁵ and R⁶ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of divalent aromatic groups as Ar include groups respectively represented by the following formulae:

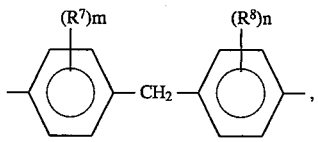

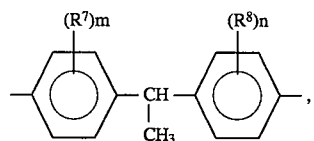

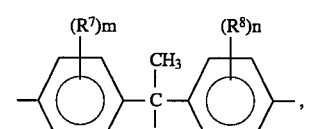

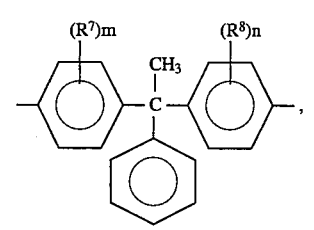

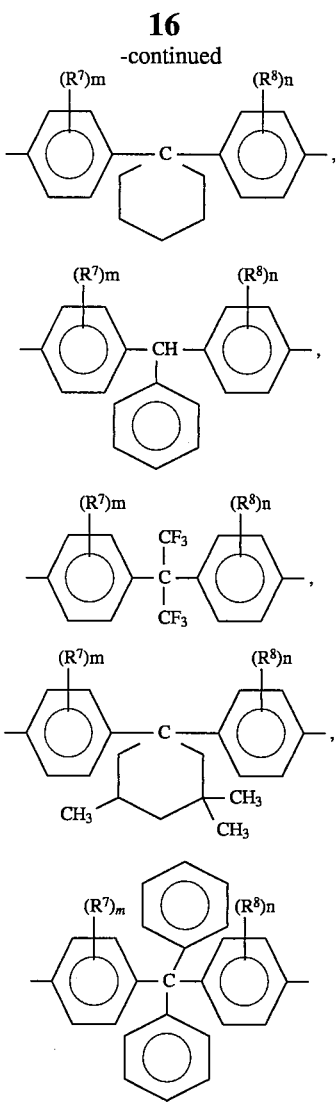

and

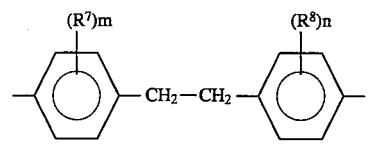

wherein each of R⁷ and R⁸ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, R⁷'s are the same or different, and when n is an integer of from 2 to 4, R⁸'s are the same or different.

Further, examples of divalent aromatic groups as Ar also include those which are represented by the following formula:

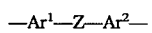

wherein Ar¹ and Ar² are as defined above; and Z represents a single bond or a divalent group, such as —O—, —CO—, —S—, —SO₂—, —SO—, —COO—, or —CON(R¹)—, wherein R¹ is as defined above.

Examples of such divalent aromatic groups as Ar include groups respectively represented by the following formulae:

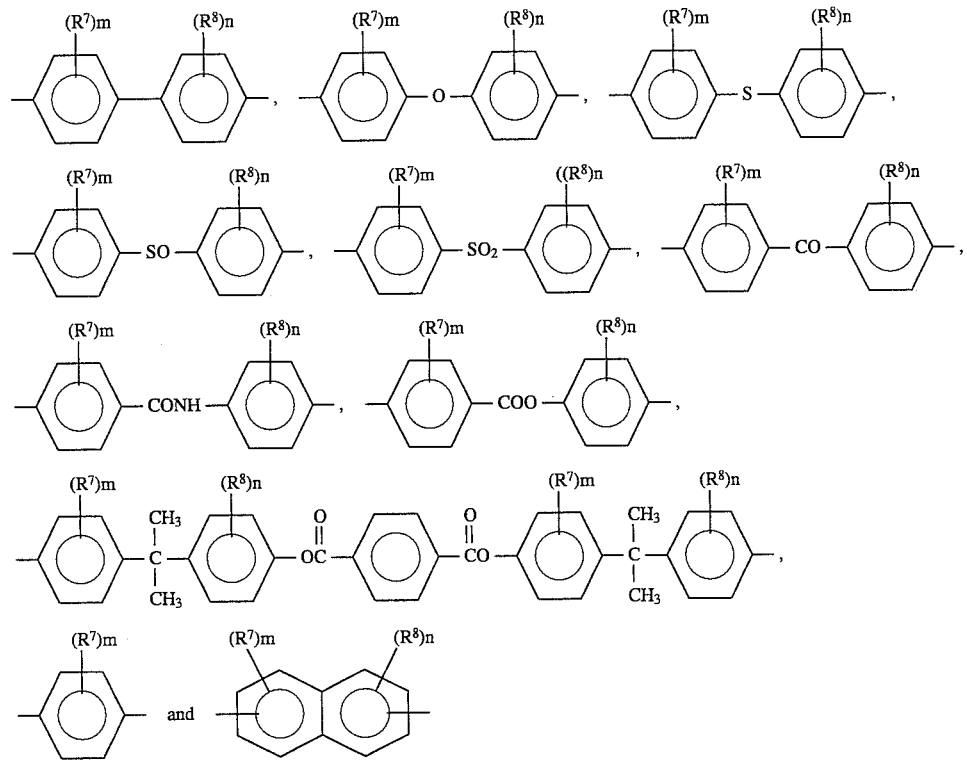

wherein $R^7$, $R^8$, m and n are as defined above.

In the method of the present invention, the aromatic dihydroxy compounds can be used individually or in combination. Representative examples of aromatic dihydroxy compounds include bisphenol A.

The diaryl carbonate used in the present invention is represented by the following formula:

wherein each of $Ar^3$ and $Ar^4$ independently represents a monovalent aromatic group.

Each of $Ar^3$ and $Ar^4$ independently represents a monovalent carbocyclic or heterocyclic aromatic group. At least one hydrogen atom of each of $Ar^3$ and $Ar^4$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group.

Preferred examples of monovalent aromatic groups as $Ar^3$ and $Ar^4$ are those respectively represented by the following formulae:

Representative examples of diaryl carbonates include a substituted or unsubstituted diphenyl carbonate compound represented by the following formula:

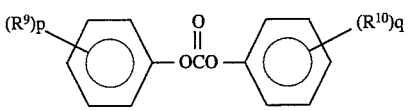

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of 2 or more, $R^{10}$'s are the same or different.

Of these diphenyl carbonate compounds, preferred are diaryl carbonates having a symmetrical configuration, such as (unsubstituted) diphenyl carbonate, ditolyl carbonate, and a diphenyl carbonate substituted with a lower alkyl group, e.g., di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e. a charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 500 to 100,000, preferably from 500 to 30,000.

In the present invention, the term "molten monomer mixture of an aromatic dihydroxy compound and a diaryl carbonate" means a homogeneous mixture of the monomers which is obtained by mixing the aromatic dihydroxy compound and the diaryl carbonate while heating. The molten monomer mixture can be obtained by mixing the aromatic dihydroxy compound and the diaryl carbonate while heating at a temperature in the range of from 150° C. to 200° C. In the present invention, the term "molten prepolymer" means a polycondensate, which is obtained by a process comprising reacting an aromatic dihydroxy compound with a diaryl carbonate, and has a lower molecular weight than a final aromatic polycarbonate to be produced by the method of the present invention. The range of the molecular weight of the molten prepolymer to be used in the present invention varies depending on the molecular weight of a final aromatic polycarbonate to be produced. For example, when it is intended to obtain an aromatic polycarbonate having a number average molecular weight of 10,000, the number average molecular weight range of the molten prepolymer is less than 10,000; and when it is intended to obtain an aromatic polycarbonate having a number average molecular weight of 20,000, the number average molecular weight range of the molten prepolymer is less than 20,000.

In the method of the present invention, a polymerizing material [which is at least one member selected from the group consisting of a) a molten monomer mixture of an aromatic dihydroxy compound and a diaryl carbonate, and b) a molten prepolymer obtained by a process comprising reacting an aromatic dihydroxy compound with a diaryl carbonate] is allowed to pass downwardly through a foraminous plate and fall along and in contact with a wire through a wire-wetting fall polymerization reaction zone, thereby effecting polymerization of the polymerizing material during the wire-wetting fall thereof.

The foraminous plate to be used in the present invention has at least one hole. The feeding zone in the wire-wetting fall polymerizer communicates, through the hole, with a polymerization zone comprising a wire-wetting fall polymerization reaction zone. The wire-wetting fall polymerization reaction zone has at least one wire in correspondence with the hole, and the wire is securely held at one end thereof in an upper end portion of the wire-wetting fall polymerization reaction zone and extends downwardly through the wire-wetting fall polymerization reaction zone.

There is no particular limitation with respect to the shape of holes of the foraminous plate to be used in the method of the present invention. Generally, the morphology of a hole is selected from a circle, an ellipse, a triangle, a slit, a polygon, a star and the like. The area of each hole of the foraminous plate is usually from 0.01 to 100 cm$^2$ preferably from 0.05 to 10 cm$^2$, more preferably from 0.1 to 5 cm$^2$. The foraminous plate may have a nozzle or the like connected thereto. The distance between adjacent holes is generally from 1 to 500 mm, preferably from 5 to 100 mm, as measured between the centers of the adjacent holes.

The term "wire" used herein means a metallic material which has a small value in respect of the ratio of the average perimeter of the cross-section of the metallic material to the length of the metallic material as measured in the direction perpendicular to the cross-section. There is no particular limitation with respect to the above ratio, but it is usually from $\frac{1}{2}$ to $\frac{1}{1,000,000}$, preferably from $\frac{1}{5}$ to 500,000, more preferably from $\frac{1}{10}$ to 50,000.

There is also no particular limitation to the morphology of the cross-section of the wire. Generally, the morphology of the cross-section of the wire is selected from a circle, an ellipse, a triangle, a quadrangle, a polygon, a star and the like. The morphology of the cross-section of the wire may be uniform or varying along the length of the wire. The wire may be hollow. The wire may be made of a single strand, or made of a plurality of strands, wherein, for example, the strands are twisted together or fabricated into a chain, or wherein the strands are hung with a space between mutually adjacent ones of the strands, the space being surely held by means a linear or a platy spacer fixedly connecting thereto the strands at their respective intermediate points, so that the strands are prevented from contacting therebetween. The surface of the wire may be smooth or jagged or may have projections locally. There is no particular limitation on the type of the metallic material of the wire, but the metallic material is generally selected from stainless steel, carbon steel, Hastelloy, nickel, titanium, chromium and other alloys. The surface of the wire may, if desired, be treated with, for example, plating, lining, passivation, or washing with an acid or phenol.

In the present invention, generally a single wire corresponds to a single hole of the foraminous plate. However, if desired, a single wire may correspond to a plurality of holes, so that a plurality of streams of polymerizing material which have been allowed to pass through a plurality of holes, respectively, are joined into a single stream and allowed to fall along and in contact with a single wire. Alternatively, a plurality of wires may correspond to a single hole, so that a single stream of polymerizing material which has been allowed to pass through a single hole, may be separated into a plurality of streams, so that the plurality of streams are allowed to fall along and in contact with a plurality of wires, respectively.

With respect to the positional relationship between the at least one wire and the foraminous plate, and to the positional relationship between the at least one wire and the at least one hole of the foraminous plate, there is no particular limitation as long as a polymerizing material fed to the feeding zone is enabled to pass downwardly through the foraminous plate and fall along and in contact with the at least one wire toward the lower end of the at least one wire. The wire and foraminous plate either may be or may not be in contact with each other.

Figure 10:
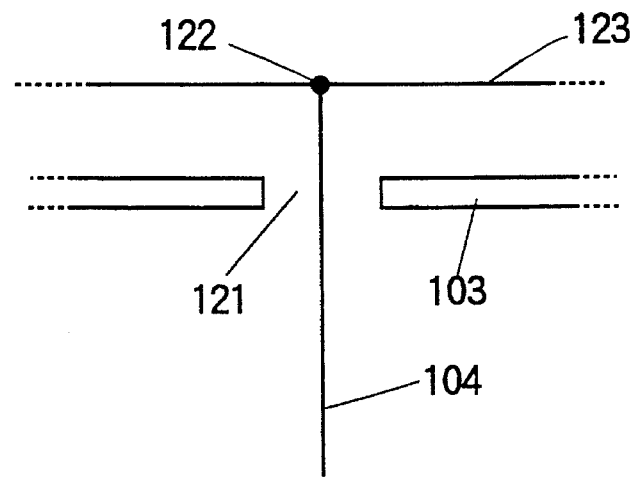
FIGS. 10 to 12 show various manners for securely holding at least one wire at one end thereof in an upper end portion of a wire-wetting fall polymerization reaction zone.
Figure 11:
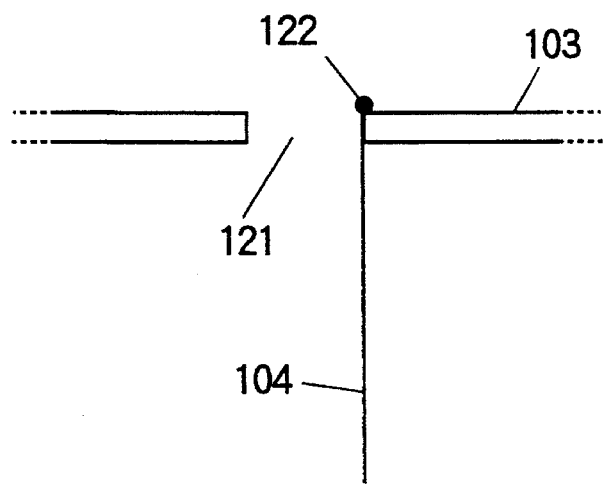
Figure 12:
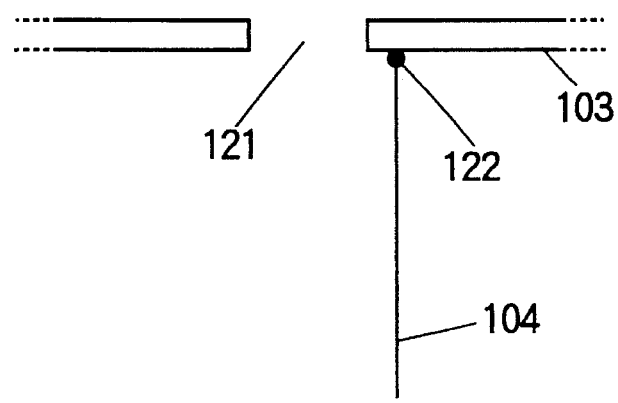

FIGS. 10 to 12 respectively show three examples of manners in which the wire is provided in correspondence with the hole of the foraminous plate.

In FIG. 10, the upper end of wire 104 is secured to support rod 123 provided above foraminous plate 103, and wire 104 extends downwardly through hole 121 of foraminous plate 103. Wire 104 and support rod 123 are secured to each other at fixation point 122. It is possible that support rod 123 be omitted and the upper end of wire 104 be connected, for example, to the upper inner wall surface (not shown) of the wire-wetting fall polymerizer.

In FIG. 11, the upper end of wire 104 is secured to the upper circumferential edge of hole 121 of foraminous plate 103 at fixation point 122, and wire 104 extends downwardly through hole 121 of foraminous plate 103.

In FIG. 12, the upper end of wire 104 is secured to the lower surface of foraminous plate 103 at fixation point 122, and wire 104 extends downwardly from the lower surface of foraminous plate 103.

Alternatively, the upper end of wire 104 may be positioned below hole 121 of foraminous plate 103. In such a case, a polymerizing material which has passed downwardly through foraminous plate 103 may freely fall before falling along and in contact with wire 104 toward the lower end of wire 104. This embodiment (in which a wire-wetting fall is immediately preceded by a free fall) is enabled, for example, by a method in which a wire is attached to a support rod as shown in FIG. 10, and support rod 123 having wire 104 attached thereto is provided not at a position above foraminous plate 103 as shown in FIG. 10, but at a position below foraminous plate 103.

Further, the wire-wetting fall polymerization may be followed by a free-fall polymerization wherein a wire-wetting fall polymerized product is consecutively allowed to fall freely through a free-fall polymerization reaction zone after leaving the lower end of the wire, the free-fall polymerization reaction zone being provided downstream of and contiguously to the wire-wetting fall polymerization reaction zone.

Examples of methods for allowing a polymerizing material to pass through the foraminous plate and fall along and in contact with the wire, include a method in which only gravitational force is utilized, and a method in which the polymerizing material is pressurized by means of a pump or the like.

With respect to the number of holes in the foraminous plate, there is no particular limitation, but the number of holes may vary depending on conditions, such as the reaction temperature and pressure, the amount of catalyst, and the range of molecular weight of polycarbonate to be produced. For example, when a polymer is to be produced at a rate of 100 kg/hr, usually 10 to $10^5$ holes are necessary. A distance through which the wire-wetting fall of the polymerizing material is conducted is preferably from 0.3 m or more, more preferably from 0.3 to 50 m, still more preferably from 0.5 to 20 m.

In the present invention, as described above, the polymerization zone comprising the wire-wetting fall polymerization reaction zone may further comprise a free-fall polymerization reaction zone on at least one side selected from an upstream side and a downstream side relative to the wire-wetting fall polymerization reaction zone in contiguous relationship. With respect to the distance through which such a free-fall is conducted, there is no particular limitation, but the free-fall distance is generally from 0.5 cm to 10 m on an upstream and/or a downstream side relative to the wire-wetting fall polymerization.

A flow rate at which the polymerizing material passes through the holes of the foraminous plate may vary depending on the molecular weight of the polymerizing material. The flow rate per hole is preferably from $10^{-2}$ to $10^2$ liters/hr, more preferably from 0.1 to 50 liters/hr. When the flow rate is higher than the above range, the polymerization rate tends to be decreased, whereas when the flow rate is lower than the above range, the productivity tends to be lowered.

The wire-wetting fall time is not particularly limited, but is generally from 1 second to 100 hours.

In the present invention, a polymer obtained by the wire-wetting fall polymerization can be withdrawn, as such, from the polymerizer, but it is preferred that the polymer be recirculated to the feeding zone having the foraminous plate for further wire-wetting fall polymerization. In this case, residence time of polymer in a reservoir portion at the bottom of the wire-wetting fall polymerization reaction zone or in a recirculation line can be prolonged according to the time necessary for polycondensation reaction. When the obtained polymer is recirculated and subjected to further wire-wetting fall polymerization, a renewed liquid surface area formed per unit time becomes large, so that a desired molecular weight can be easily achieved.

Preferred examples of embodiments of the method of the present invention include a method wherein the feeding of the polymerizing material (molten monomer mixture and/or molten prepolymer) to the feeding zone having the foraminous plate is continuously conducted, and which method further comprises continuously conducting a sequence of steps of recirculating, to the feeding zone (having the foraminous plate), a part of the polymer obtained at the bottom of the wire-wetting fall polymerization reaction zone, and allowing an admixture of the continuously fed polymerizing material and the recirculated polymer to pass downwardly through the foraminous plate and fall along and in contact with the wire through the wire-wetting fall polymerization reaction zone, thereby continuously effecting a wire-wetting fall polymerization of the admixture during the wire-wetting fall thereof, while continuously withdrawing the remainder of the polymer obtained at the bottom of the wire-wetting fall polymerization reaction zone. According to this embodiment, polymerization can be carried out stably for a prolonged period of time without an accumulation of low molecular weight polycondensate and the like on a foraminous plate. This is one of the great advantages of the present invention.

In the present invention, the reaction temperature for reacting the aromatic dihydroxy compound with the diaryl carbonate is generally in the range of from 50° to 350° C., preferably from 100° to 290° C.

As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination. The preferred reaction pressure may vary depending on the type of the aromatic polycarbonate to be produced, the molecular weight of the molten monomer mixture or molten prepolymer, and the polymerization temperature. For example, in the case of a reaction in which an aromatic polycarbonate is produced from bisphenol A and diphenyl carbonate, when the number average molecular weight of the molten monomer mixture or molten prepolymer is less than 1,000, the reaction pressure is preferably from 50 mmHg to atmospheric pressure. In this case, when the number average molecular weight is from 1,000 to 2,000, the reaction pressure is preferably from 3 to 80 mmHg. When the number average molecular weight is greater than 2,000, the reaction pressure is preferably 10 mmHg or less, more preferably 5 mmHg or less.

It is particularly preferred that the polymerization be carried out under reduced pressure while introducing an inert gas as mentioned above. By this method, a high degree of polymerization can efficiently be achieved without causing problems, such as mutual contact of adjacent wires due to turbulence of gasflow.

A melt polycondensation reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1$, $R^2$, $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts to be used is generally in the range of from $10^{-8}$ to 1% by weight, preferably from $10^{-7}$ to $10^{-1}$% by weight, based on the weight of the aromatic dihydroxy compound.

Preferred modes of the method of the present invention in which a wire-wetting fall polymerizer is used are explained hereinbelow, referring to the accompanying drawings.

Figure 2:
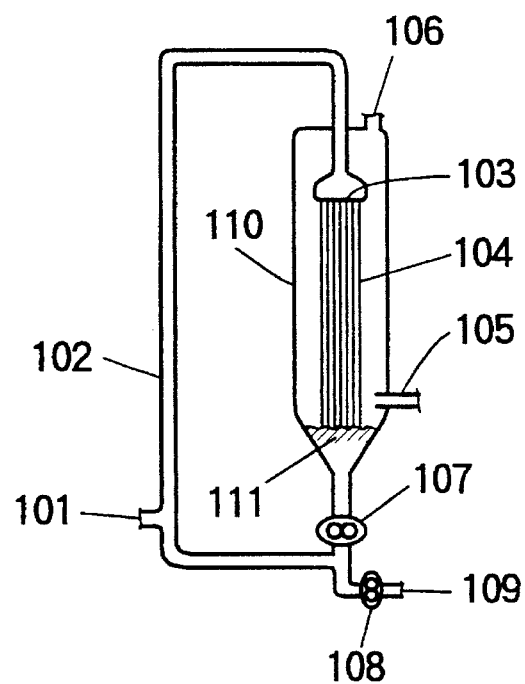

FIGS. 1 and 2 show two forms of polymerization apparatus (each containing a wire-wetting fall polymerizer) usable for carrying out the method of the present invention. When the polymerization apparatus of FIG. 1 is used, a polymerizing material [which is at least one material selected from the group consisting of a) a molten monomer mixture of an aromatic dihydroxy compound and a diaryl carbonate, and b) a molten prepolymer obtained by a process comprising reacting an aromatic dihydroxy compound with a diaryl carbonate] is fed through inlet 101 and fed to a feeding zone having foraminous plate 103, and allowed to pass downwardly through foraminous plate 103 and fall along and in contact with wire 104 through a wire-wetting fall polymerization reaction zone in polymerizer 110. The internal pressure of wire-wetting fall polymerizer 110 is controlled to a predetermined value. An aromatic monohydroxy compound and the like evaporated from the polymerization reaction system and an inert gas, such as nitrogen, which is optionally fed from gas feed port 105, are discharged through vent 106. The resultant polymer obtained at the bottom of the wire-wetting fall polymerization reaction zone is withdrawn through outlet 109 by means of discharge pump 108. The main body of free-fall polymerizer 110 and the like are heated to and kept at an elevated temperature by means of a heater and a jacket.

When a polymerization apparatus of FIG. 2 is used, a polymerizing material (which is as defined above) is fed through inlet 101 to recirculation line 102 and fed to a feeding zone having foraminous plate 103, and allowed to pass downwardly through foraminous plate 103 and fall along and in contact with wire 104 through a wire-wetting fall polymerization reaction zone in wire-wetting fall polymerizer 110. The internal pressure of wire-wetting fall polymerizer 110 is maintained at a predetermined level. A by-produced and evaporated aromatic monohydroxy compound and the like, and an inert gas, such as nitrogen, which is optionally fed from gas feed port 105, are discharged through vent 106. The resultant polymer obtained at the bottom of the wire-wetting fall polymerization reaction zone is recirculated through recirculation line 102 (having recirculation pump 107) to the feeding zone having foraminous plate 103, and allowed to pass through foraminous plate 103 and fall along and in contact with wire 104 through the wire-wetting fall polymerization reaction zone in polymerizer 110, thereby increasing the degree of polymerization of the recirculated polymer during the wire-wetting fall thereof. After the degree of polymerization has reached a predetermined level, the polymer is withdrawn through outlet 109 by means of discharge pump 108. The main body of wire-wetting fall polymerizer 110, recirculation line 102 and the like are heated to and kept at an elevated temperature by means of a heater and a jacket.

When wire-wetting fall polymerizer 110 of FIG. 2 is used for batchwise polymerization, all of the polymerizing material selected from the molten monomer mixture and the molten prepolymer is fed through inlet 101 at the start of the operation at a time, and polymerization is carried out in a closed system while recirculating until a polymer having a predetermined degree of polymerization is obtained. The obtained polymer is withdrawn through outlet 109. When wire-wetting fall polymerizer 110 of FIG. 2 is used for continuous polymerization, the polymerizing material is continuously fed through inlet 101 to conduct wire-wetting fall polymerization, while the resultant polymer (having a predetermined molecular weight) is continuously withdrawn through outlet 109 at a controlled rate such that a predetermined amount of molten polycondensate mixture is present in the polymerizer.

A polymerizer to be used in the present invention may be equipped with an agitator at the bottom, but such an agitator is not essential. Therefore, it is possible to employ a wire-wetting fall polymerizer which does not have a rotary driving part in a main body thereof and hence it is possible to carry out polymerization under tightly sealed conditions even under high vacuum. The recirculation pump in the recirculation line has a rotary driving part, but the rotary driving part of the recirculation pump in the recirculation line is highly sealed, thus differing from a rotary driving part as provided in the main body of a polymerizer, because the recirculation pump is submerged below a liquid head of molten condensate mixture accumulated at the bottom of the main body.

The method of the present invention can be practiced using a single polymerizer, but, if desired, two or more polymerizers can be used. Moreover, the interior of a single polymerizer may be partitioned vertically or horizontally into a plurality of compartments so that the compartments can be used as multiple polymerizers.

In the present invention, it is possible to carry out the entire process of polymerizing a molten monomer mixture of an aromatic dihydroxy compound and a diaryl carbonate for obtaining a final aromatic polycarbonate having a predetermined molecular weight by only a wire-wetting fall polymerization using a foraminous plate and a wire. But it is also possible to combine the wire-wetting fall polymerization with other polymerization methods, such as a free-fall polymerization, a thin film-state polymerization, an agitation polymerization using a vertical agitation type polymerizer vessel, and an agitation polymerization using a horizontal agitation type polymerizer vessel.

The free-fall polymerization mentioned above is a method in which at least one starting material, selected from the group consisting of a molten monomer mixture of an aromatic dihydroxy compound and a diaryl carbonate and a molten prepolymer obtained by reacting an aromatic dihydroxy compound with a diaryl carbonate, is introduced to an introduction zone having a perforated plate and allowed to pass downwardly through the perforated plate and fall freely through a free-fall polymerization reaction zone, thereby effecting the polymerization during the free-fall.

The term "free-fall" used in the present invention means a fall under vacuum or non-vacuum conditions, during which a falling starting material does not contact an object causing resistance to fall, such as a guide or a wall. The starting material is allowed to fall freely in the form of a film, a filament, a droplet, a spray or the like. During the free-fall, by-products, such as phenol, are evaporated from the falling starting material being polymerized.

There is no particular limitation with respect to the shape of holes of the perforated plate to be used for conducting a free-fall polymerization in the present invention. Generally, the morphology of a hole is selected from a circle, an ellipse, a triangle, a slit, a polygon, a star and the like. The area of each hole of the perforated plate is usually from 0.01 to 100 $cm^2$, preferably from 0.05 to 10 $cm^2$, more preferably from 0.1 to 5 $cm^2$. The perforated plate may have a nozzle or the like connected thereto, as long as a starting material can fall freely after passing such a nozzle or the like. The distance between adjacent holes is generally from 1 to 500 mm, preferably from 10 to 100 mm, more preferably from 15 to 50 mm, as measured between the centers of the adjacent holes. With respect to the number of holes in the perforated plate, there is no particular limitation, but the number of holes may vary depending on conditions, such as the reaction temperature and pressure, the amount of catalyst, and the range of molecular weight of a prepolymer to be produced.

A distance through which the free-fall of the starting material is conducted is preferably from 0.3 to 50 m, more preferably from 0.5 to 20 m, from the perforated plate.

A flow rate at which the starting material passes through the holes of the perforated plate may vary depending on the molecular weight of the starting material. The flow rate per hole is generally from $10^{-4}$ to $10^4$ liters/hr, preferably from $10^{-2}$ to $10^2$ liters/hr, more preferably from 0.1 to 50 liters/hr.

The free-fall time is not particularly limited, but is generally from 0.01 seconds to 1 hour.

A prepolymer obtained by the free-fall polymerization can be withdrawn, as such, from the polymerizer, but it is preferred that the prepolymer be recirculated to the introduction zone having the perforated plate for further free-fall polymerization. In this case, residence time of prepolymer in a reservoir portion at the bottom of the free-fall polymerization reaction zone or in a recirculation line can be prolonged according to the time necessary for polycondensation reaction.

As the agitation vessel of the agitation type polymerizer vessel, any of the agitation vessels described, for example, in Chapter 11 of "Kagaku Sohchi Binran (*Handbook of Chemical Apparatus*)" edited by "Kagaku Kogyo Kyokai (the Society of Chemical Engineers, Japan)", (1989) can be used. The morphology of the agitation vessel is not particularly limited. Generally, a vertical or a horizontal cylinder type vessel can be used. The shape of the agitator is also not particularly limited. Agitators of anchor type, turbine type, screw type, ribbon type, double blade type and the like can be used.

Examples of thin film-state polymerizers include a wall-wetting fall polymerizer and polymerizers containing a centrifugal thin film heat exchanger or an agitated thin film heat exchanger.

In a wall-wetting fall polymerization, a starting material is fed in molten state to an upper portion of a wall extending downwardly through a wall-wetting fall polymerization reaction zone, and allowed to fall along and in contact with the surface of the wall, thereby effecting the polymerization during the wall-wetting fall thereof. Examples of apparatuses which can be used for the wall-wetting fall polymerization includes a reactor described, for example, in page 461 of Chapter 11 of "Kagaku Sohchi Binran (Handbook of Chemical Apparatus)" (1989) edited by "Kagaku Kogyo Kyokai (the Society of Chemical Engineers, Japan)". A wall-wetting fall polymerizer may be of multiple tube type. Further, a fallen prepolymer obtained at the bottom of the wall-wetting fall polymerization reaction zone may be recirculated to the top of the wall for further polymerization of the prepolymer.

Examples of agitated thin film heat exchangers and centrifugal thin film heat exchangers include those described in Chapters 21 and 22 of "Netsukoukanki Sekkei Handbukku (Handbook for Designing Heat Exchangers)" (1974) published by Kogak Tosho Co., Japan.

Examples of horizontal agitation type polymerizers include those of screw type and separate blade type. Examples of screw type polymerizers include those of single-screw type and twin-screw type. These horizontal agitation type polymerizers are described, for example, in the research report "Reactive Processing Part 2" (1992) edited by Hannou Kougaku Kenkyukai (Research Group of Reaction Engineering) of Koubunshi Gakukai (Society of Polymer Science, Japan).

Preferred embodiments of combinations of the process of the present invention with another polymerization method or other methods are explained below, but these embodiments should not be construed as limiting the scope of the present invention.

(1) Combination of a free-fall polymerization using a perforated plate and a wire-wetting fall polymerization using a foraminous plate and a wire One preferred example of modes of combinations of the wire-wetting fall polymerization process with other polymerization methods is a combination of a free-fall polymerization using a perforated plate and a wire-wetting fall polymerization using a foraminous plate and a wire.

Figure 3:
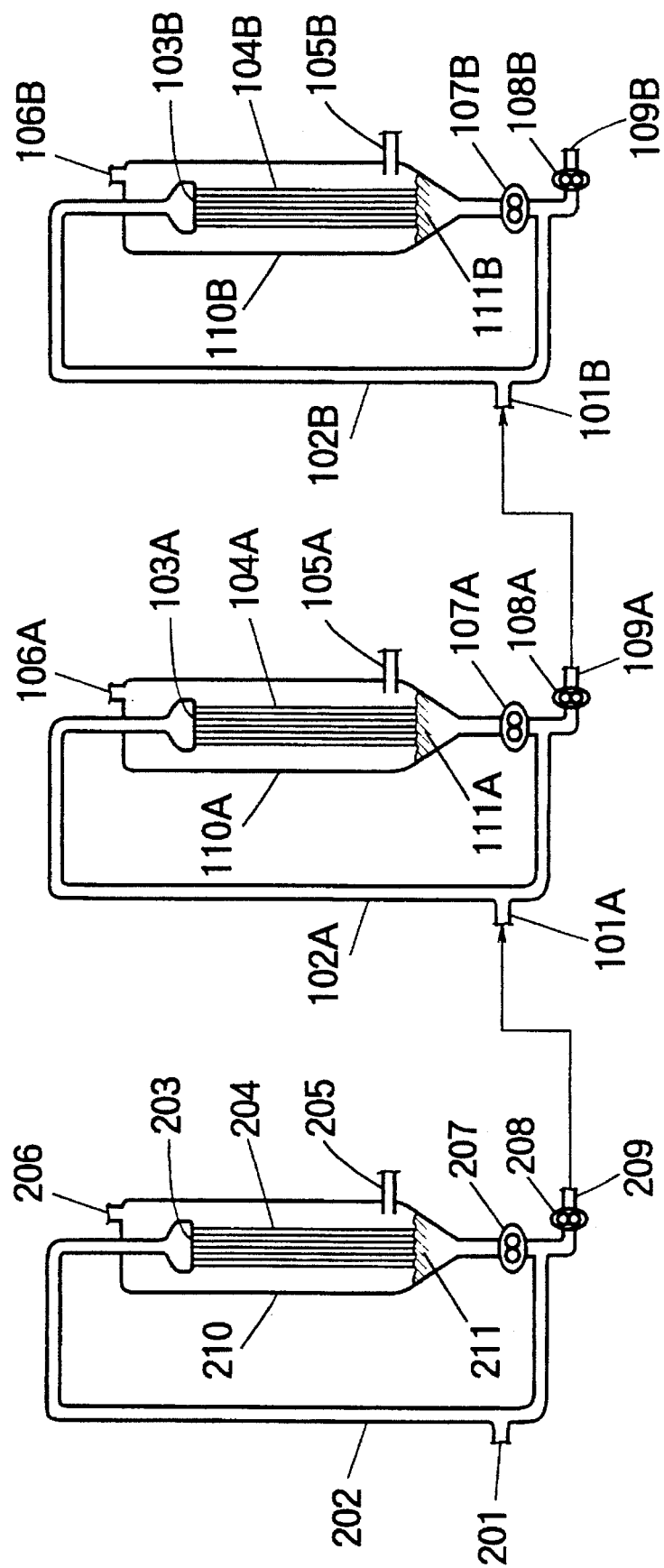
FIGS. 3 to 9 are diagrams showing various systems for practicing the method of the present invention.

FIG. 3 shows an embodiment of this combination. In FIG. 3, at least one starting material selected from the group consisting of a molten monomer mixture of an aromatic dihydroxy compound and a diaryl carbonate, and a first prepolymer (defined above), is fed through inlet 201 to recirculation line 202 of free-fall polymerizer 210 and then introduced to an introduction zone having perforated plate 203, and is allowed to pass through perforated plate 203 and fall freely through the free-fall polymerization zone in free-fall polymerizer 210. Starting material 204 falls freely in the form of a film, a filament, a droplet or a spray, while being polymerized to form a prepolymer. The internal pressure of the polymerizer 210 is controlled to a predetermined value. A by-produced aromatic monohydroxy compound and the like evaporated from the polymerization system, and an inert gas, such as nitrogen, which is optionally fed from gas feed port 205, are discharged through vent 206. The resultant molten prepolymer (and the unpolymerized molten monomer mixture, if any) obtained at the bottom of the free-fall polymerization zone is recirculated through recirculation line 202 having recirculation pump 207 to the introduction zone having perforated plate 203, and allowed to pass through perforated plate 203.

After the degree of polymerization has reached a predetermined level, prepolymer 211 (second prepolymer) is withdrawn through outlet 209 and fed through inlet 101A of first wire-wetting fall polymerizer 110A to recirculation line 102A by means of transfer pump 208. The prepolymer is then fed to a feeding zone having foraminous plate 103A and allowed to pass downwardly through foraminous plate 103A and fall along and in contact with wire 104A through the wire-wetting fall polymerization zone of first wire-wetting fall polymerizer 110A. The internal pressure of the polymerizer 110A is controlled to a predetermined level. A by-produced aromatic monohydroxy compound and the like evaporated from the prepolymer, and an inert gas, such as nitrogen, which is optionally fed from gas feed port 105A, are discharged through vent 106A. The resultant prepolymer obtained at the bottom of the wire-wetting fall polymerization zone is recirculated through recirculation line 102A having recirculation pump 107A to the feeding zone having foraminous plate 103A and allowed to pass downwardly through foraminous plate 103A.

After the degree of polymerization has reached a predetermined level, prepolymer 111A is withdrawn through outlet 109A and fed through inlet 101B of second wire-wetting fall polymerizer 110B to recirculation line 102B by means of transfer pump 108A. The prepolymer is then fed to the feeding zone having foraminate plate 103B and allowed to pass downwardly through foraminate plate 103B and fall along and in contact with wire 104B though the wire-wetting fall polymerization zone of second wire-wetting polymerizer 110B.

The internal pressure of the polymerizer 110B is controlled to a predetermined level. A by-produced aromatic monohydroxy compound and the like evaporated from the prepolymer, and an inert gas, such as nitrogen, which is optionally fed from gas feed port 105B, are discharged through vent 106B. The resultant prepolymer obtained at the bottom of the wire-wetting fall polymerization zone is recirculated through recirculation line 102B having recirculation pump 107B to the feeding zone having foraminous plate 103B and allowed to pass downwardly through foraminous plate 103B. Resultant molten polymer 111B, obtained at the bottom of the wire-wetting fall polymerization zone, is withdrawn through outlet 109B by means of discharge pump 108B. With respect to both the free-fall and the wire-wetting fall polymerizations, all of the polymerizers, recirculation lines, transfer lines, discharge lines and the like are heated to and kept at an elevated temperature by means of a heater and a jacket.

(2) Combination of an agitation polymerization using a vertical agitation type polymerizer vessel and a wire-wetting fall polymerization using a foraminous plate and a wire Another preferred example of modes of combinations of the wire-wetting fall polymerization process with other polymerization methods is a combination of an agitation polymerization using a vertical agitation type polymerizer vessel and a wire-wetting fall polymerization using a foraminous plate and a wire.

Figure 4:
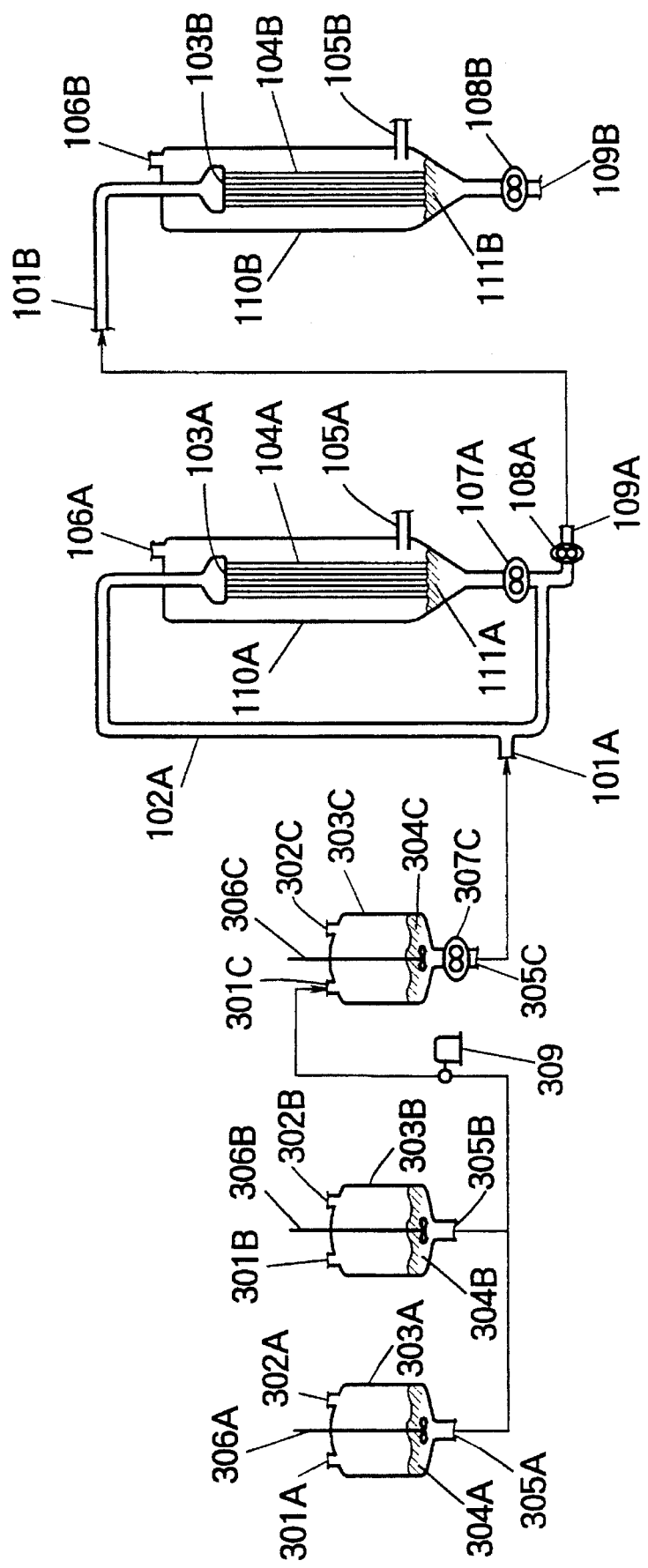

FIG. 4 shows an embodiment of this combination. In FIG. 4, at least one starting material selected from the group consisting of a monomer mixture of an aromatic dihydroxy compound and a diaryl carbonate, and a first prepolymer (defined above), is introduced to first vertical agitation type polymerizer vessels 303A and 303B, respectively, through inlet 301A of polymerizer 303A and inlet 301B of polymerizer 303B. First agitation type polymerizer vessels 303A and 303B have vertical agitators 306A and 306B, respectively. First agitation type polymerizer vessels 303A and 303B are the same, and are adapted to be alternately operated when, for example, it is intended to produce a prepolymer in a batchwise manner by means of each of these polymerizer vessels 303A and 303B. Each of polymerizer vessels 303A and 303B is filled with an inert gas, such as nitrogen, and the internal pressure of each polymerizer is usually controlled to a level around atmospheric pressure. A by-produced and evaporated aromatic monohydroxy compound and the like are discharged from polymerizer vessels 303A and 303B, respectively, through vents 302A and 302B. Prepolymers 304A and 304B, obtained by the polymerization for a predetermined reaction time under agitation in respective polymerizer vessels 303A and 303B, are discharged through outlets 305A and 305B, respectively, transferred by means of transfer pump 309, and introduced to second vertical agitation type polymerizer vessel 303C through inlet 301C.

Second agitation type polymerizer vessel 303C has vertical agitator 306C. The interior of polymerizer 303C is maintained at reduced pressure, and a by-produced and evaporated aromatic monohydroxy compound and the like are discharged through vent 302C. Second prepolymer (defined above) 304C, obtained by the polymerization for a predetermined reaction time under agitation in polymerizer 303C, is discharged through outlet 305C and transferred by means of transfer pump 307C to first wire-wetting fall polymerizer 110A, having a foraminous plate.

That is, in the first wire-wetting fall polymerization, second prepolymer 304C, obtained by agitation polymerization in second agitation type polymerizer vessel 303C, is continuously fed to first wire-wetting fall polymerizer 110A at its feeding zone (having foraminous plate 103A) through inlet 101A provided in recirculation line 102A, and allowed to pass downwardly through foraminous plate 103A and fall along and in contact with wire 104A through a wire-wetting fall polymerization reaction zone in first wire-wetting fall polymerizer 110A. The internal pressure of the polymerizer is maintained at a predetermined level. A by-produced and evaporated aromatic monohydroxy compound and the like, and an inert gas, such as nitrogen, which is optionally fed through gas feed port 105A, are discharged through vent 106A. The resultant prepolymer obtained at the bottom of the wire-wetting fall polymerization reaction zone is recirculated through recirculation line 102A (having recirculation pump 107A) to the feeding zone having foraminous plate 103A, and allowed to pass downwardly through foraminous plate 103A and fall along and in contact with wire 104A through the wire-wetting fall polymerization reaction zone in the wire-wetting fall polymerizer, thereby increasing the degree of polymerization of the recirculated prepolymer during the wire-wetting fall thereof. Prepolymer 111A having a predetermined degree of polymerization is continuously withdrawn through outlet 109A, by means of transfer pump 108A, and fed to a second wire-wetting fall polymerizer 110B at its feeding zone (having foraminous plate 103B) through inlet 101B, and allowed to pass downwardly through foraminous plate 103B and fall along and in contact with wire 104B through a wire-wetting fall polymerization reaction zone in second wire-wetting fall polymerizer 110B. The internal pressure of the polymerizer is maintained at a predetermined level. A by-produced and evaporated aromatic monohydroxy compound and the like, and an inert gas, such as nitrogen, which is optionally fed through gas feed port 105B, are discharged through vent 106B. Resultant molten polymer 111B, obtained at the bottom of the wire-wetting fall polymerization reaction zone, is withdrawn through outlet 109B by means of discharge pump 108B. With respect to both the agitation and the wire-wetting fall polymerizations, all of the polymerizers, recirculation lines, transfer lines, discharge lines and the like are heated to and kept at an elevated temperature by means of a heater and a jacket.

(3) Combination of an agitation polymerization using a horizontal agitation type polymerizer vessel and a wire-wetting fall polymerization using a foraminous plate and a wire Still another preferred example of modes of combinations of the wire-wetting fall polymerization process with other polymerization methods is a combination of an agitation polymerization using a horizontal agitation type polymerizer vessel and a wire-wetting fall polymerization using a foraminous plate and a wire.

Figure 5:
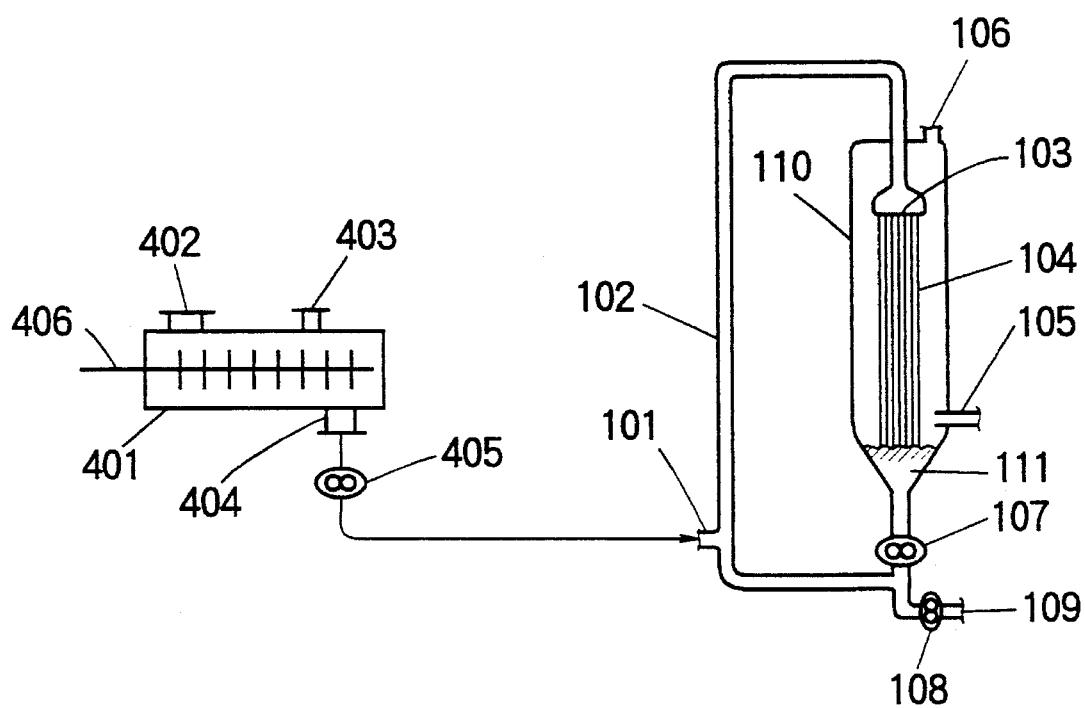

FIG. 5 shows an embodiment of this combination. In FIG. 5, at least one starting material selected from the group consisting of a monomer mixture of an aromatic dihydroxy compound and a diaryl carbonate, and a first prepolymer (defined above), is introduced to horizontal agitation type polymerizer vessel 401 through inlet 402 of polymerizer 401. Agitation type polymerizer vessel 401 has horizontal agitator 406. The internal pressure of the polymerizer is maintained at a predetermined level. A by-produced and evaporated aromatic monohydroxy compound and the like, and an inert gas, such as nitrogen, which is optionally fed, are discharged from polymerizer vessel 401 through vent 403. A second prepolymer (defined above), obtained by the polymerization for a predetermined reaction time under agitation in polymerizer 401, is discharged through outlet 404 and transferred by means of transfer pump 405 to wire-wetting fall polymerizer 110, having a foraminous plate.

That is, in the wire-wetting fall polymerization, the second prepolymer, obtained by agitation polymerization in agitation type polymerizer vessel 401, is continuously fed to wire-wetting fall polymerizer 110 at its feeding zone (having foraminous plate 103) through inlet 101 provided in recirculation line 102, and allowed to pass downwardly through foraminous plate 103 and fall along and in contact with wire 104 through a wire-wetting fall polymerization reaction zone in wire-wetting fall polymerizer 110. The internal pressure of the polymerizer is maintained at a predetermined level. A by-produced and evaporated aromatic monohydroxy compound and the like, and an inert gas, such as nitrogen, which is optionally fed through gas feed port 105, are discharged through vent 106. The resultant prepolymer obtained at the bottom of the wire-wetting fall polymerization reaction zone is recirculated through recirculation line 102 (having recirculation pump 107) to the feeding zone having foraminous plate 103, and allowed to pass downwardly through foraminous plate 103 and fall along and in contact with wire 104 through the wire-wetting fall polymerization reaction zone in the wire-wetting fall polymerizer, thereby increasing the degree of polymerization of the recirculated prepolymer during the wire-wetting fall thereof. Resultant molten polymer 111, obtained at the bottom of the wire-wetting fall polymerization reaction zone, is withdrawn through outlet 109 by means of discharge pump 108. With respect to both the agitation and the wire-wetting fall polymerizations, all of the polymerizers, recirculation lines, transfer lines, discharge lines and the like are heated to and kept at an elevated temperature by means of a heater and a jacket.

(4) Combination of a thin film-state polymerization and a wire-wetting fall polymerization using a foraminous plate and a wire A further preferred example of modes of combinations of the wire-wetting fall polymerization process with other polymerization methods is a combination of a thin film-state polymerization and the wire-wetting fall polymerization.

This combination is explained below by taking an embodiment (shown in FIG. 6) in which a wall-wetting fall polymerization is used as an example of a thin film-state polymerization. In the wall-wetting fall polymerization of this embodiment, a starting material (defined above) is fed in molten state to an upper portion of a wall extending through a wall-wetting fall polymerization reaction zone, and the starting material is allowed to fall along and in contact with the surface of the wall, thereby effecting a wall-wetting fall polymerization of the starting material during the wall-wetting fall thereof to obtain a second prepolymer at the bottom of the wall-wetting fall polymerization reaction zone. Since a large heat-transfer surface area is available in the wall-wetting fall polymerization, it can efficiently provide latent heat of evaporation of an aromatic monohydroxy compound and the like. Further, because a large evaporating surface area is available in the wall-wetting fall polymerization, an aromatic monohydroxy compound and the like can be removed efficiently, so that the polymerization can proceed rapidly.

Figure 6:
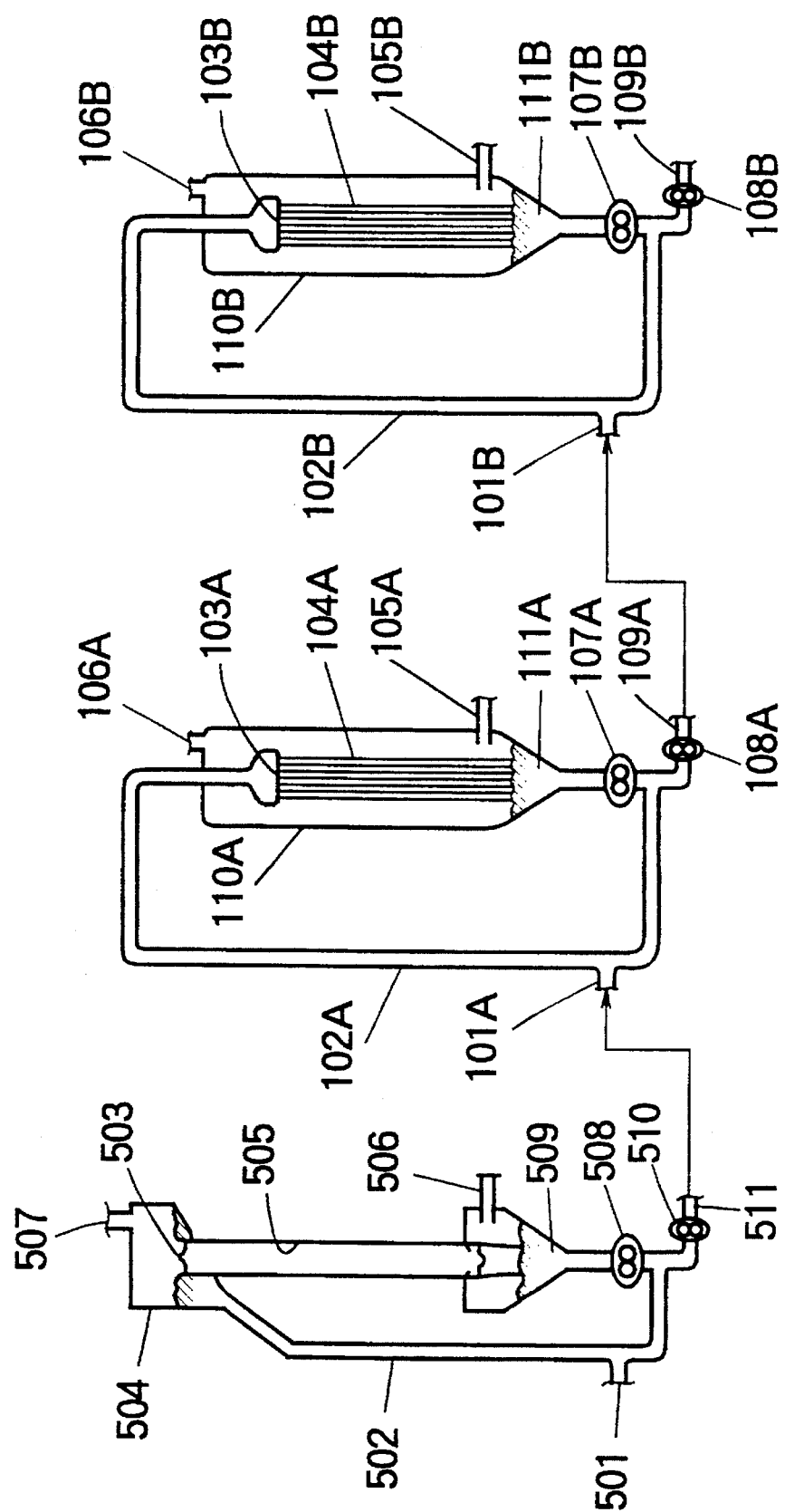

FIG. 6 shows an embodiment of the above-mentioned combination. In FIG. 6, at least one starting material selected from the group consisting of a monomer mixture of an aromatic dihydroxy compound and a diaryl carbonate, and a first prepolymer (defined above), is continuously fed through inlet 501 and recirculation line 502 and introduced through overflow port 503 into wall-wetting fall polymerizer 504. The introduced starting material falls along and in contact with the inner wall of a tube in the form of film-like prepolymer 505, thereby effecting a wall-wetting fall polymerization. The internal pressure of the polymerizer is maintained at a predetermined level. A by-produced and evaporated aromatic monohydroxy compound and the like, and an inert gas, such as nitrogen, which is optionally fed through gas-feed port 506, are discharged through vent 507. The resultant prepolymer at the bottom of the polymerizer is recirculated by means of recirculation pump 508 to overflow port 503 of the wall-wetting polymerizer through recirculation line 502 and introduced to the wall-wetting fall polymerizer. Second prepolymer 509, having a predetermined degree of polymerization, is withdrawn through outlet 511 and transferred by means of transfer pump 510 to first wire-wetting fall polymerizer 110A (having a foraminous plate).

That is, in the first wire-wetting fall polymerization, second prepolymer 509, obtained by the wall-wetting fall polymerization in wall-wetting fall polymerizer 504, is continuously fed to first wire-wetting fall polymerizer 110A at its feeding zone (having foraminous plate 103A) through inlet 101A provided in recirculation line 102A, and allowed to pass downwardly through foraminous plate 103A and fall along and in contact with wire 104A through a wire-wetting fall polymerization reaction zone in first wire-wetting fall polymerizer 110A. The internal pressure of the polymerizer is maintained at a predetermined level. A by-produced and evaporated aromatic monohydroxy compound and the like, and an inert gas, such as nitrogen, which is optionally fed through gas feed port 105A, are discharged through vent 106A. The resultant prepolymer obtained at the bottom of the wire-wetting fall polymerization reaction zone is recirculated through recirculation line 102A (having recirculation pump 107A) to the feeding zone having foraminous plate 103A, and allowed to pass downwardly through foraminous plate 103A and fall along and in contact with wire 104A through the wire-wetting fall polymerization reaction zone in the wire-wetting fall polymerizer, thereby increasing the degree of polymerization of the recirculated prepolymer during the wire-wetting fall thereof. Prepolymer 111A having a predetermined degree of polymerization is withdrawn through outlet 109A, by means of transfer pump 108A, and continuously fed to second wire-wetting fall polymerizer 110B at its feeding zone (having foraminous plate 103B) through inlet 101B provided in recirculation line 102B, and allowed to pass downwardly through foraminous plate 103B and fall along and in contact with wire 104B through a wire-wetting fall polymerization reaction zone in second wire-wetting fall polymerizer 110B. The internal pressure of the polymerizer is maintained at a predetermined level. A by-produced and evaporated aromatic monohydroxy compound and the like, and an inert gas, such as nitrogen, which is optionally fed through gas feed port 105B, are discharged through vent 106B. The resultant prepolymer obtained at the bottom of the wire-wetting fall polymerization reaction zone is recirculated through recirculation line 102B (having recirculation pump 107B) to the feeding zone having foraminous plate 103B, and allowed to pass downwardly through foraminous plate 103B and fall along and in contact with wire 104B through the wire-wetting fall polymerization reaction zone in the wire-wetting fall polymerizer, thereby increasing the degree of polymerization of the recirculated prepolymer during the wire-wetting fall thereof. Resultant molten polymer 111B, obtained at the bottom of the wire-wetting fall polymerization reaction zone, is withdrawn through outlet 109B by means of discharge pump 108B. With respect to both the wall-wetting fall and the wire-wetting fall polymerizations, all of the polymerizers, recirculation lines, transfer lines, discharge lines and the like are heated to and kept at an elevated temperature by means of a heater and a jacket.

(5) Combination of an agitation polymerization using a vertical agitation type polymerizer vessel, a free-fall polymerization using a perforated plate and a wire-wetting fall polymerization using a foraminous plate and a wire Still a further preferred example of modes of combinations of the wire-wetting fall polymerization process with other polymerization methods is a combination of an agitation polymerization using a vertical agitation type polymerizer vessel, a free-fall polymerization using a perforated plate and a wire-wetting fall polymerization using a foraminous plate and a wire.

Figure 7:
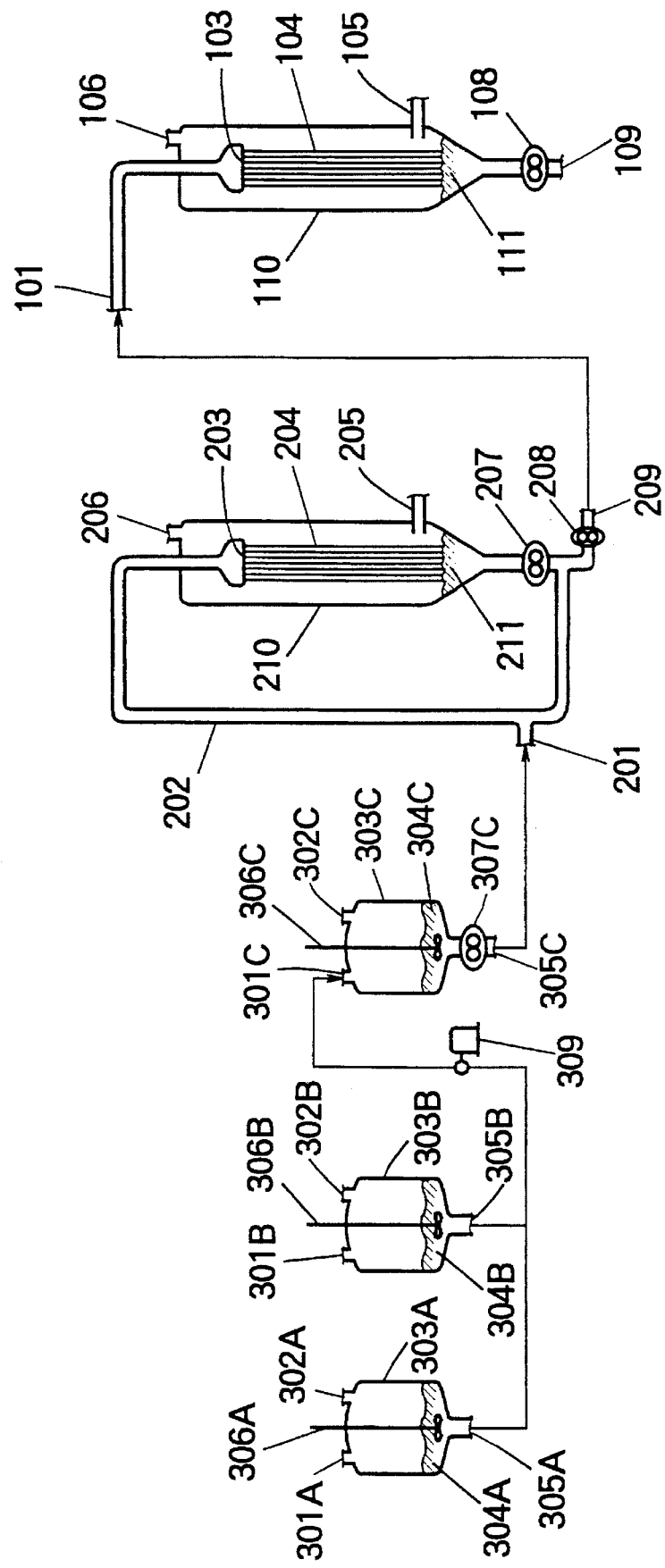

FIG. 7 shows an embodiment of this combination. In FIG. 7, at least one starting material selected from the group consisting of a monomer mixture of an aromatic dihydroxy compound and a diaryl carbonate, and a first prepolymer (defined above), is introduced to first vertical agitation type polymerizer vessels 303A and 303B, respectively, through inlet 301A of polymerizer 303A and inlet 301B of polymerizer 303B. First agitation type polymerizer vessels 303A and 303B have vertical agitators 306A and 306B, respectively. First agitation type polymerizer vessels 303A and 303B are the same, and are adapted to be alternately operated when, for example, it is intended to produce a prepolymer in a batchwise manner by means of each of these polymerizer vessels 303A and 303B. Each of polymerizer vessels 303A and 303B is filled with an inert gas, such as nitrogen, and the internal pressure of each polymerizer is usually controlled to a level around atmospheric pressure. A by-produced and evaporated aromatic monohydroxy compound and the like are discharged from polymerizer vessels 303A and 303B, respectively, through vents 302A and 302B. Prepolymers 304A and 304B, obtained by the polymerization for a predetermined reaction time under agitation in respective polymerizer vessels 303A and 303B, are discharged through outlets 305A and 305B, respectively, transferred by means of transfer pump 309, and introduced to second vertical agitation type polymerizer vessel 303C through inlet 301C.

Second agitation type polymerizer vessel 303C has vertical agitator 306C. The interior of polymerizer 303C is maintained at reduced pressure, and a by-produced and evaporated aromatic monohydroxy compound and the like are discharged through vent 302C. Second prepolymer (defined above) 304C, obtained by the polymerization for a predetermined reaction time under agitation in polymerizer 303C, is discharged through outlet 305C and transferred by means of transfer pump 307C to free-fall polymerizer 210A, having a perforated plate.

That is, in the free-fall polymerization, second prepolymer 304C, obtained by the agitation polymerization in polymerizer 303C, is continuously fed to free-fall polymerizer 210 at its introduction zone (having perforated plate 203) through inlet 201 provided in recirculation line 202, and allowed to pass through perforated plate 203 and fall freely through a free-fall polymerization reaction zone in free-fall polymerizer 210. Second prepolymer 204 falls freely in the form of a film, a filament, a droplet or a spray. The internal pressure of the polymerizer is maintained at a predetermined level. A by-produced and evaporated aromatic monohydroxy compound and the like, and an inert gas, such as nitrogen, which is optionally fed through gas feed port 205, are discharged through vent 206. The resultant prepolymer obtained at the bottom of the free-fall polymerization reaction zone is recirculated through recirculation line 202 (having recirculation pump 207) to the introduction zone having perforated plate 203, and allowed to pass through perforated plate 203 and fall freely through the free-fall polymerization reaction zone in the free-fall polymerizer, thereby increasing the degree of polymerization of the recirculated prepolymer during the free-fall thereof. Resultant third prepolymer (defined above) 211 having a predetermined degree of polymerization is continuously withdrawn through outlet 209, by means of transfer pump 208, and fed to wire-wetting fall polymerizer 110 having foraminous plate 103.

That is, in the wire-wetting fall polymerization, third prepolymer 211, obtained by free-fall polymerization in free-fall polymerizer 210, is continuously fed to wire-wetting fall polymerizer 110 at its feeding zone (having foraminous plate 103) through inlet 101, and allowed to pass downwardly through foraminous plate 103 and fall along and in contact with wire 104 through a wire-wetting fall polymerization reaction zone in wire-wetting fall polymerizer 110. The internal pressure of the polymerizer is maintained at a predetermined level. A by-produced and evaporated aromatic monohydroxy compound and the like, and an inert gas, such as nitrogen, which is optionally fed through gas feed port 105, are discharged through vent 106. Resultant molten polymer 111, obtained at the bottom of the wire-wetting fall polymerization reaction zone, is withdrawn through outlet 109 by means of discharge-pump 108. With respect to all of the agitation, the free-fall and the wire-wetting fall polymerizations, all of the polymerizers, recirculation lines, transfer lines, discharge lines and the like are heated to and kept at an elevated temperature by means of a heater and a jacket.

(6) Combination of an agitation polymerization using a vertical agitation type polymerizer vessel, an agitation polymerization using a horizontal agitation type polymerizer vessel and a wire-wetting fall polymerization using a foraminous plate and a wire Still a further preferred example of modes of combinations of the wire-wetting fall polymerization process with other polymerization methods is a combination of an agitation polymerization using a vertical agitation type polymerizer vessel, an agitation polymerization using a horizontal agitation type polymerizer vessel and a wire-wetting fall polymerization using a foraminous plate and a wire.

Figure 8:
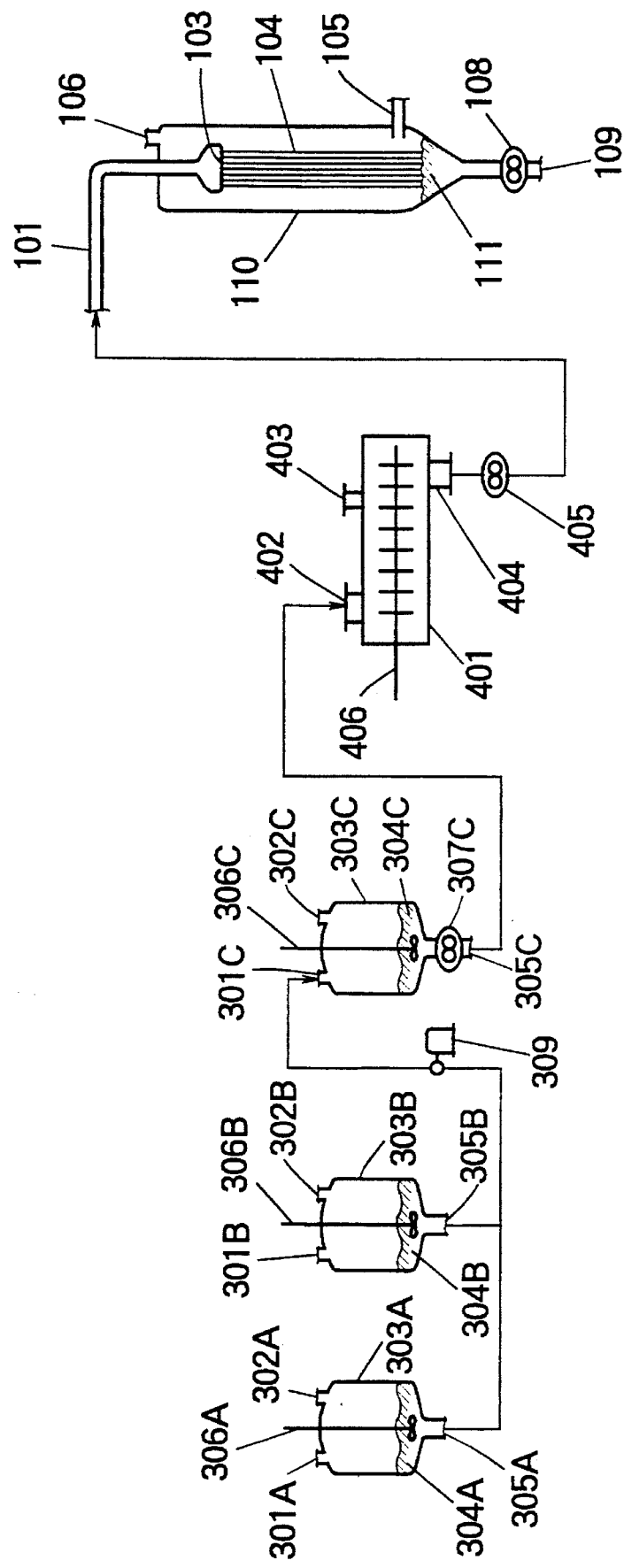

FIG. 8 shows an embodiment of this combination. In FIG. 8, at least one starting material selected from the group consisting of a monomer mixture of an aromatic dihydroxy compound and a diaryl carbonate, and a first prepolymer (defined above), is introduced to first vertical agitation type polymerizer vessels 303A and 303B, respectively, through inlet 301A of polymerizer 303A and inlet 301B of polymerizer 303B. First agitation type polymerizer vessels 303A and 303B have vertical agitators 306A and 306B, respectively. First agitation type polymerizer vessels 303A and 303B are the same, and are adapted to be alternately operated when, for example, it is intended to produce a prepolymer in a batchwise manner by means of each of these polymerizer vessels 303A and 303B. Each of polymerizer vessels 303A and 303B is filled with an inert gas, such as nitrogen, and the internal pressure of each polymerizer is usually controlled to a level around atmospheric pressure. A by-produced and evaporated aromatic monohydroxy compound and the like are discharged from polymerizer vessels 303A and 303B, respectively, through vents 302A and 302B. Prepolymers 304A and 304B, obtained by the polymerization for a predetermined reaction time under agitation in respective polymerizer vessels 303A and 303B, are discharged through outlets 305A and 305B, respectively, transferred by means of transfer pump 309, and introduced to second vertical agitation type polymerizer vessel 303C through inlet 301C.

Second agitation type polymerizer vessel 303C has vertical agitator 306C. The interior of polymerizer 303C is maintained at reduced pressure, and a by-produced and evaporated aromatic monohydroxy compound and the like are discharged through vent 302C. Second prepolymer (defined above) 304C, obtained by the polymerization for a predetermined reaction time under agitation in polymerizer 303C, is discharged through outlet 305C and transferred by means of transfer pump 307C to horizontal agitation type polymerizer vessel 401 through inlet 402 of polymerizer 401.

Agitation type polymerizer vessel 401 has horizontal agitator 406. The internal pressure of the polymerizer is maintained at a predetermined level. A by-produced and evaporated aromatic monohydroxy compound and the like, and an inert gas, such as nitrogen, which is optionally fed, are discharged from polymerizer vessel 401 through vent 403. A third prepolymer (defined above), obtained by the polymerization for a predetermined reaction time under agitation in polymerizer 401, is discharged through outlet 404 and transferred by means of transfer pump 405 to wire-wetting fall polymerizer 110, having a foraminous plate.

That is, in the wire-wetting fall polymerization, the third prepolymer, obtained by agitation polymerization in horizontal agitation type polymerizer vessel 401, is continuously fed to wire-wetting fall polymerizer 110 at its feeding zone (having foraminous plate 103) through inlet 101, and allowed to pass downwardly through foraminous plate 103 and fall along and in contact with wire 104 through a wire-wetting fall polymerization reaction zone in wire-wetting fall polymerizer 110. The internal pressure of the polymerizer is maintained at a predetermined level. A by-produced and evaporated aromatic monohydroxy compound and the like, and an inert gas, such as nitrogen, which is optionally fed through gas feed port 105, are discharged through vent 106. Resultant molten polymer 111, obtained at the bottom of the wire-wetting fall polymerization reaction zone, is withdrawn through outlet 109 by means of discharge pump 108. With respect to both the agitation and the wire-wetting fall polymerizations, all of the polymerizers, transfer lines, discharge lines and the like are heated to and kept at an elevated temperature by means of a heater and a jacket.

(7) Combination of an agitation polymerization using a vertical agitation type polymerizer vessel, a thin film-state polymerization and a wire-wetting fall polymerization using a foraminous plate and a wire Still a further preferred example of modes of combinations of the wire-wetting fall polymerization process with other polymerization methods is a combination of an agitation polymerization using a vertical agitation type polymerizer vessel, a thin film-state polymerization and the wire-wetting fall polymerization.

This combination is explained below by taking an embodiment (shown in FIG. 9) in which a wall-wetting fall polymerization is used as an example of a thin film-state polymerization.

Figure 9:
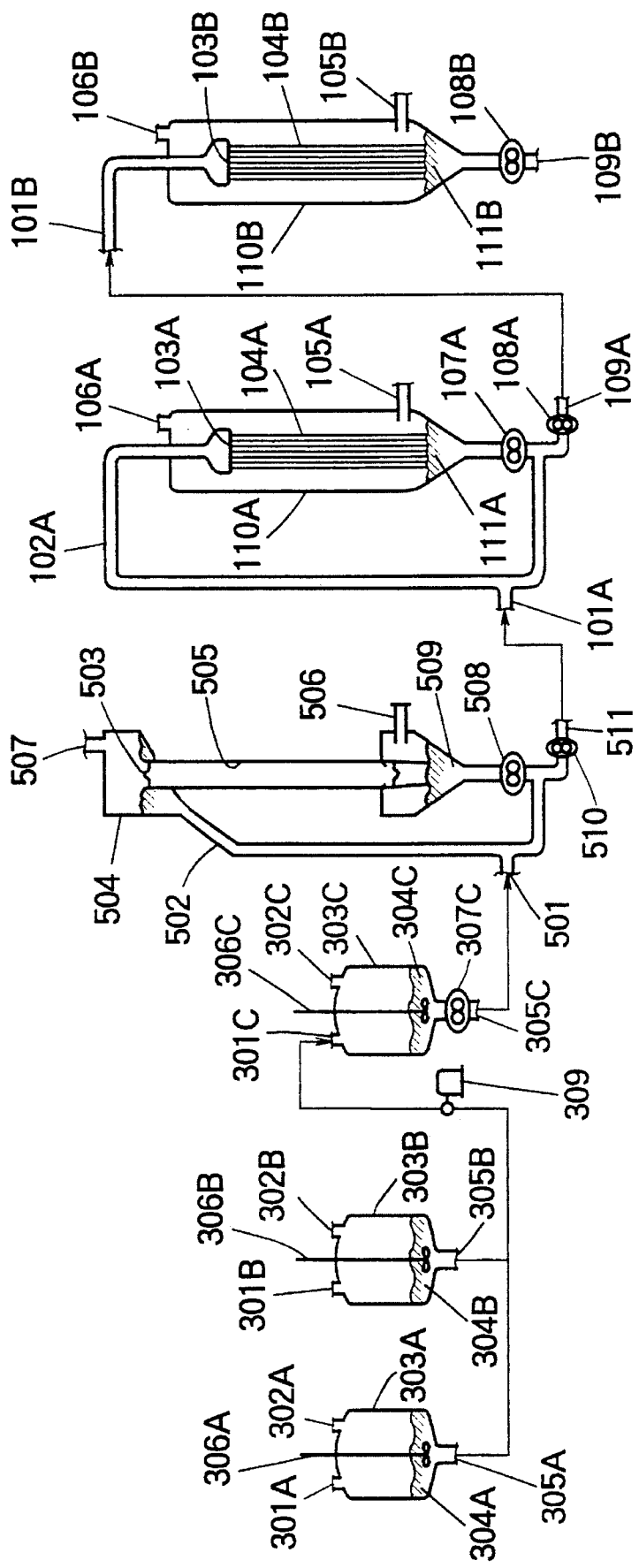

FIG. 9 shows an embodiment of this combination. In FIG. 9, at least one starting material selected from the group consisting of a monomer mixture of an aromatic dihydroxy compound and a diaryl carbonate, and a first prepolymer (defined above), is introduced to first vertical agitation type polymerizer vessels 303A and 303B, respectively, through inlet 301A of polymerizer 303A and inlet 301B of polymerizer 303B. First agitation type polymerizer vessels 303A and 303B have vertical agitators 306A and 306B, respectively. First agitation type polymerizer vessels 303A and 303B are the same, and are adapted to be alternately operated when, for example, it is intended to produce a prepolymer in a batchwise manner by means of each of these polymerizer vessels 303A and 303B. Each of polymerizer vessels 303A and 303B is filled with an inert gas, such as nitrogen, and the internal pressure of each polymerizer is usually controlled to a level around atmospheric pressure. A by-produced and evaporated aromatic monohydroxy compound and the like are discharged from polymerizer vessels 303A and 303B, respectively, through vents 302A and 302B. Prepolymers 304A and 304B, obtained by the polymerization for a predetermined reaction time under agitation in respective polymerizer vessels 303A and 303B, are discharged through outlets 305A and 305B, respectively, transferred by means of transfer pump 309, and introduced to second vertical agitation type polymerizer vessel 303C through inlet 301C.

Second agitation type polymerizer vessel 303C has vertical agitator 306C. The interior of polymerizer 303C is maintained at reduced pressure, and a by-produced and evaporated aromatic monohydroxy compound and the like are discharged through vent 302C. Second prepolymer (defined above) 304C, obtained by the polymerization for a predetermined reaction time under agitation in polymerizer 303C, is discharged through outlet 305C and transferred by means of transfer pump 307C to wall-wetting fall polymerizer 504.

That is, in the wall-wetting fall polymerization, second prepolymer (defined above) 304C, obtained by agitation polymerization in polymerizer 303C, is continuously fed through inlet 501 and recirculation line 502 and introduced through overflow port 503 into wall-wetting fall polymerizer 504. The introduced second prepolymer falls along and in contact with the inner wall of a tube in the form of film-like prepolymer 505, thereby effecting a wall-wetting fall polymerization. The internal pressure of the polymerizer is maintained at a predetermined level. A by-produced and evaporated aromatic monohydroxy compound and the like, and an inert gas, such as nitrogen, which is optionally fed through gas-feed port 506, are discharged through vent 507. The resultant prepolymer at the bottom of the polymerizer is recirculated by means of recirculation pump 508 to overflow port 503 of the wall-wetting fall polymerizer through recirculation line 502 and introduced to the wall-wetting fall polymerizer. Third prepolymer (defined above) 509, having a predetermined degree of polymerization, is withdrawn through outlet 511 and transferred by means of transfer pump 510 to first wire-wetting fall polymerizer 110A (having a foraminous plate).

That is, in the first wire-wetting fall polymerization, third prepolymer 509, obtained by the wall-wetting fall polymerization in wall-wetting fall polymerizer 504, is continuously fed to first wire-wetting fall polymerizer 110A at its feeding zone (having foraminous plate 103A) through inlet 101A provided in recirculation line 102A, and allowed to pass downwardly through foraminous plate 103A and fall along and in contact with wire 104A through a wire-wetting fall polymerization reaction zone in first wire-wetting fall polymerizer 110A. The internal pressure of the polymerizer is maintained at a predetermined level. A by-produced and evaporated aromatic monohydroxy compound and the like, and an inert gas, such as nitrogen, which is optionally fed through gas feed port 105A, are discharged through vent 106A. The resultant prepolymer obtained at the bottom of the wire-wetting fall polymerization reaction zone is recirculated through recirculation line 102A (having recirculation pump 107A) to the feeding zone having foraminous plate 103A, and allowed to pass downwardly through foraminous plate 103A and fall along and in contact with wire 104A through the wire-wetting fall polymerization reaction zone in the wire-wetting fall polymerizer, thereby increasing the degree of polymerization of the recirculated prepolymer during the wire-wetting fall thereof. Prepolymer 111A having a predetermined degree of polymerization is continuously withdrawn through outlet 109A, by means of transfer pump 108A, and fed to second wire-wetting fall polymerizer 110B at its feeding zone (having foraminous plate 103B) through inlet 101B, and allowed to pass downwardly through foraminous plate 103B and fall along and in contact with wire 104B through a wire-wetting fall polymerization reaction zone in second wire-wetting fall polymerizer 110B. The internal pressure of the polymerizer is maintained at a predetermined level. A by-produced and evaporated aromatic monohydroxy compound and the like, and an inert gas, such as nitrogen, which is optionally fed through gas feed port 105B, are discharged through vent 106B. Resultant molten polymer 111B, obtained at the bottom of the wire-wetting fall polymerization reaction zone, is withdrawn through outlet 109B by means of discharge pump 108B. With respect to all of the agitation, the wall-wetting fall and the wire-wetting fall polymerizations, all of the polymerizers, recirculation lines, transfer lines, discharge lines and the like are heated to and kept at an elevated temperature by means of a heater and a jacket.

With respect to materials for constructing the polymerizers to be used in the method of the present invention, there is no particular limitation, but stainless steel, nickel or glass is generally used as a material for at least inner wall portions of polymerizers.

In the present invention, it is also preferred that the inner wall of a polymerizer be wetted with part of a recirculated polymer in order to prevent sticking of scales to the inner wall of the polymerizer.

Hereinbelow is given a flow chart showing preferred embodiments of the method of the present invention.

Flow Chart

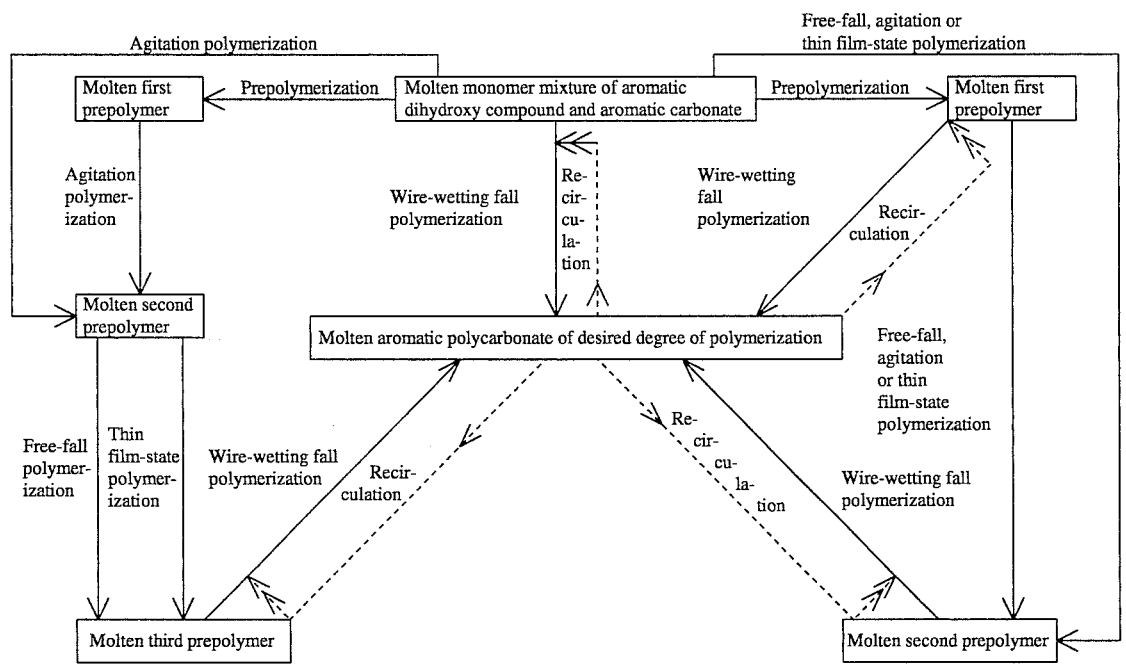

As can be seen from the above flow chart, the monomer mixture, the first prepolymer the second prepolymer or the third prepolymer can be polymerized by a wire-wetting fall polymerization to obtain an aromatic polycarbonate of a desired degree of polymerization, and the obtained aromatic polycarbonate may be recirculated to the feeding zone for wire-wetting fall polymerization in order to increase the degree of polymerization.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, the molecular weight is expressed in terms of the number average molecular weight (hereinafter referred to simply as "Mn") as measured by gel permeation chromatography (GPC). The color of the aromatic polycarbonate produced was evaluated, using a specimen having a thickness of 3.2 mm, in accordance with the CIELAB method, and the yellowness of the specimen is expressed in terms of the b*-value.

EXAMPLE 1

A wire-wetting fall polymerization reaction was carried out using a polymerization apparatus as shown in FIG. 2. Wire-wetting fall polymerizer 110 (contained in the polymerization apparatus) is equipped with foraminous plate 103, which has 50 holes each having a diameter of 7.5 mm and arranged in a zigzag configuration in which the distance (pitch) between the adjacent holes is 30 mm as measured between the centers of the adjacent holes. In wire-wetting fall polymerizer 110, 50 strands of 0.1 mm$\phi$ SUS 316 wires are hung vertically from the respective holes of foraminous plate 103 to a reservoir portion at the bottom of wire-wetting fall polymerizer 110, wherein, as shown in FIG. 10, each wire 104 is secured at the upper end thereof to support rod 123 provided above foraminous plate 103, and extends downwardly through hole 121 of foraminous plate 103. The wire-wetting fall distance is 4 m.

30 Liters of a prepolymer having an Mn of 4,700, prepared by reacting bisphenol A with diphenyl carbonate in a molar ratio of 1:1.05, were introduced to wire-wetting fall polymerizer 110, and a wire-wetting fall polymerization reaction was batchwise carried out for 2 hours under polymerization reaction conditions wherein the reaction temperature was 280° C., the reaction pressure was 0.4 mmHg, and the flow rate of nitrogen gas was 2 liters/hr to obtain a polymer, while recirculating the obtained polymer to the feeding zone (having foraminous plate 103) of wire-wetting fall polymerizer 110 through recirculation line 102 at a recirculation rate of 25 liters/hr (i.e., a recirculation rate with respect to each hole of foraminous plate 103 is 0.5 liter/hr). Resultant polymer 111, which was withdrawn through outlet 109 by means of discharge pump 108, was a colorless transparent aromatic polycarbonate having an Mn of 5,500 and a b*-value of 3.3.

EXAMPLE 2

A wire-wetting fall polymerization reaction was carried out using a polymerization apparatus as shown in FIG. 1. Wire-wetting fall polymerizer 110 (contained in the polymerization apparatus) is equipped with foraminous plate 103, which has 10 holes having a diameter of 5 mm and arranged in a zigzag configuration. In wire-wetting fall polymerizer 110, 10 strands of 0.8 mm$\phi$ SUS 316 wires are hung vertically from the respective holes of foraminous plate 103 to a reservoir portion at the bottom of wire-wetting fall polymerizer 110, wherein, as shown in FIG. 10, each wire 104 is secured at the upper end thereof to support rod 123 provided above foraminous plate 103, and extends downwardly through hole 121 of foraminous plate 103. The wire-wetting fall distance is 4 m.

A prepolymer having an Mn of 7,800, prepared by reacting bisphenol A with diphenyl carbonate in a molar ratio of 1:1.08, was continuously fed to wire-wetting fall polymerizer 110 at 5 liters/hr (i.e., 0.5 liter/hr with respect to each hole of foraminous plate 103), so that a wire-wetting fall polymerization reaction of the prepolymer was carried out under polymerization reaction conditions wherein the reaction temperature was 250° C., the reaction pressure was 0.3 mmHg, and the flow rate of nitrogen gas was 1 liter/hr, while continuously withdrawing a part of produced polymer 111 so that the level of polymer 111 in the reservoir portion at the bottom of wire-wetting fall polymerizer 110 was constantly maintained. The wire-wetting fall polymerization was continuously conducted for 1,000 hours. The average residence time of the prepolymer in wire-wetting fall polymerizer 110 was 2 hours. Results are shown in Table 1. After completion of the wire-wetting fall polymerization reaction, no accumulation of low molecular weight polymer and the like was observed on foraminous plate 103.

EXAMPLES 3 to 5

Polymerization reactions of the same prepolymer as used in Example 2 (which had been prepared by reacting bisphenol A with diphenyl carbonate in a molar ratio of 1:1.08) were individually carried out using the same polymerization apparatus as used in Example 2 and shown in FIG. 1, in substantially the same manner as in Example 2, except that the polymerization reaction conditions were varied as shown in Table 1. Results are shown in Table 1. After completion of the wire-wetting fall polymerization reaction in any of Examples 3 to 5, no accumulation of low molecular weight polymer and the like was observed on foraminous plate 103.

Comparative Example 1

An aromatic polycarbonate was produced using a horizontal twin-screw agitation type polymerizer instead of a wire-wetting fall polymerizer. The horizontal twin-screw agitation type polymerizer has a capacity of 30 liters, an L/D ratio of 6, and a twin-screw agitator having a rotation diameter of 140 mm.

An agitation polymerization reaction was continuously carried out while continuously feeding the same prepolymer as used in Example 2 at a flow rate of 5 liters/hr and continuously withdrawing a part of the produced aromatic polycarbonate so that the volume of the reaction mixture in the twin-screw agitation type polymerizer was constantly maintained at 10 liters. The reaction conditions of the agitation polymerization reaction were as follows: the reaction was carried out for 1,000 hours, the reaction temperature was 250° C., and the reaction pressure was 0.3 mmHg. Samples were taken from the produced aromatic polycarbonates which were withdrawn at time points of 200 hours, 400 hours, 600 hours, 800 hours and 1,000 hours after the start of the polymerization reaction. The samples of the produced aromatic polycarbonates withdrawn at time points of 200 hours, 400 hours, 600 hours, 800 hours and 1,000 hours after the start of the reaction had b*-values of 3.6, 3.7, 3.8, 3.8 and 3.9, respectively, and had Mn values of 8,800, 9,000, 8,700, 8,500 and 8,600, respectively.

Comparative Example 2

An aromatic polycarbonate was produced using an agitation type polymerizer vessel instead of a wire-wetting fall polymerizer. The agitation type polymerizer has a capacity of 30 liters. The agitating blades of the agitation type polymerizer vessel are of anchor type.

An agitation polymerization reaction was continuously carried out while continuously feeding the same prepolymer as used in Example 2 at a flow rate of 5 liters/hr and continuously withdrawing a part of the produced aromatic polycarbonate so that the volume of the reaction mixture in the agitation type polymerizer was constantly maintained at 10 liters. The reaction conditions of the agitation polymerization reaction were as follows: the reaction was carried out for 1,000 hours, the reaction temperature was 250° C., and the reaction pressure was 0.3 mmHg. Samples were taken from the produced aromatic polycarbonates which were withdrawn at time points of 200 hours, 400 hours, 600 hours, 800 hours and 1,000 hours after the start of the polymerization reaction. The samples of the produced aromatic polycarbonates withdrawn at time points of 200 hours, 400 hours, 600 hours, 800 hours and 1,000 hours after the start of the reaction had b*-values of 3.5, 3.6, 3.7, 3.8 and 3.8, respectively, and had Mn values of 8,000, 8,100, 8,000, 8,100 and 8,000, respectively.

EXAMPLE 6

The same polymerization apparatus as in Example 1 and shown in FIG. 2 was used. 30 Liters of a mixture, which was prepared by adding $1 \times 10^{-6}$ mol of sodium hydroxide and $3 \times 10^{-6}$ mol of tetramethyl ammonium hydroxide to a molten mixture of bisphenol A and diphenyl carbonate (molar ratio of 1:1.05) per mole of bisphenol A, were introduced to wire-wetting fall polymerizer 110, and a wire-wetting fall polymerization reaction was batchwise carried out for 50 minutes under polymerization reaction conditions wherein the reaction temperature was 250° C., the reaction pressure was 90 mmHg, and the flow rate of nitrogen gas was 3 liters/hr to obtain a polymer, while recirculating the obtained polymer to the feeding zone (having foraminous plate 103) of wire-wetting fall polymerizer 110 through recirculation line 102 at a recirculation rate of 800 liters/hr (i.e., a recirculation rate with respect to each hole of foraminous plate 103 is 16 liters/hr). The reaction was further continued for 30 minutes under a pressure of 12 mmHg. Resultant polymer 111, which was withdrawn through outlet 109 by means of discharge pump 108, was a colorless transparent aromatic polycarbonate having an Mn of 2,500 and a b*-value of 3.1.

EXAMPLE 7

The same polymerization apparatus as used in Example 1 and shown in FIG. 2 was used. A wire-wetting fall polymerization reaction was carried out in substantially the same manner as in Example 6, except that 1,1-bis-(4-hydroxyphenyl)-3,3,5-trimethylcyclohexane was used instead of bisphenol A. A colorless transparent aromatic polycarbonate having an Mn of 2,400 and a b*-value of 3.1 was obtained.

EXAMPLE 8

An aromatic polycarbonate was produced in accordance with a system shown in FIG. 3. The system of FIG. 3 comprises a free-fall polymerization, and first stage and second stage wire-wetting fall polymerizations.

In the free-fall polymerization, free-fall polymerizer 210 was used. Free-fall polymerizer 210 is equipped with a perforated plate which has 50 holes having a diameter of 3 mm and arranged in a zigzag configuration. The free-fall distance is 4 m.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers was equipped with a foraminous plate which had 20 holes having a diameter of 5 mm and arranged in a zigzag configuration. In each of the first and second wire-wetting fall polymerizers, 20 strands of 0.8 mmφ SUS 316 wires are hung vertically from the respective holes of the foraminous plate to a reservoir portion at the bottom of the wire-wetting fall polymerizer, wherein each wire is secured in the same manner as described in Example 1 and shown in FIG. 10. In each of the first and second wire-wetting fall polymerizers, the wire-wetting fall distance is 6 m.

A molten mixture of bisphenol A and diphenyl carbonate (molar ratio of 1:1.05) was continuously fed to free-fall polymerizer 210 at 2 liters/hr, so that a free-fall polymerization reaction of the molten mixture was carried out under polymerization reaction conditions wherein the reaction temperature was 240° C., and the reaction pressure was 30 mmHg, thereby obtaining prepolymer 211, while recirculating obtained prepolymer 211 to the introduction zone (having perforated plate 203) of free-fall polymerizer 210 through recirculation line 202 at a recirculation rate of 500 liters/hr.

When the volume of prepolymer 211 at the bottom of free-fall polymerizer 210 reached 10 liters, part of prepolymer 211 was continuously fed to first wire-wetting fall polymerizer 110A so that the volume of prepolymer 211 in free-fall polymerizer 210 was constantly maintained at 10 liters. The feeding of prepolymer 211 to first wire-wetting fall polymerizer 110A was conducted through inlet 101A provided in recirculation line 102A for wire-wetting fall polymerizer 110A.

In first wire-wetting fall polymerizer 110A, a wire-wetting fall polymerization of prepolymer 211 was continuously carried out under polymerization reaction conditions wherein the reaction temperature was 250° C., and the reaction pressure was 5.0 mmHg, thereby obtaining prepolymer 111A, while recirculating a part of obtained prepolymer 111A to the feeding zone (having foraminous plate 103A) of first wire-wetting fall polymerizer 110A through recirculation line 102A at a recirculation rate of 100 liters/hr.

When the volume of prepolymer 111A at the bottom of first wire-wetting fall polymerizer 110A reached 10 liters, part of prepolymer 111A was continuously fed to second wire-wetting fall polymerizer 110B so that the volume of prepolymer ilia in first wire-wetting fall polymerizer 110A was constantly maintained at 10 liters.

In second wire-wetting fall polymerizer 110B, a wire-wetting fall polymerization reaction was continuously carried out under polymerization reaction conditions wherein the reaction temperature was 280° C., and the reaction pressure was 1.0 mmHg, thereby obtaining polymer 111B, while recirculating a part of obtained polymer 111B to the feeding zone (having foraminous plate 103B) of second wire-wetting fall polymerizer 110B through recirculation line 102B at a recirculation rate of 20 liters/hr.

When the volume of polymer 111B at the bottom of second wire-wetting fall polymerizer 110B reached 10 liters, polymer 111B was continuously withdrawn from second wire-wetting fall polymerizer 110B through outlet 109B by means of discharge pump 108B so that the volume of polymer 111B in second wire-wetting fall polymerizer 110B was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.2, 3.2 and 3.2, respectively, and had Mn values of 9,100, 9,000 and 9,100, respectively. After completion of the series of polymerization reactions continuously conducted for 600 hours, no accumulation of low molecular weight polymer and the like was observed on the perforated plate in the free-fall polymerizer and the foraminous plate in each of the first and second wire-wetting fall polymerizers.

EXAMPLE 9

An aromatic polycarbonate was produced in accordance with a system as shown in FIG. 4. The system of FIG. 4 comprises first stage and second stage agitation polymerizations, and first stage and second stage wire-wetting fall polymerizations.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a foraminous plate which has 20 holes having a diameter of 5 mm and arranged in a zigzag configuration. In each of the first and second wire-wetting fall polymerizers, 20 strands of 0.8 mmφ SUS 316 wires are hung vertically from the respective holes of the foraminous plate to a reservoir portion at the bottom of the wire-wetting fall polymerizer, wherein each wire is secured in the same manner as described in Example 1 and shown in FIG. 10. In each of the first and second wire-wetting fall polymerizers, the wire-wetting fall distance is 6 m. Only first wire-wetting fall polymerizer 110A has a recirculation line.

The first stage agitation polymerization in first agitation type polymerizer vessels 303A and 303B was batchwise conducted, whereas the second stage agitation polymerization in second agitation type polymerizer vessel 303C, and the first stage and second stage wire-wetting fall polymerizations in first and second wire-wetting fall polymerizers 110A and 110B, were continuously conducted.

The polymerization reaction conditions in both of first agitation type polymerizer vessels 303A and 303B were as follows: the reaction temperature was 180° C., the reaction pressure was atmospheric pressure, and the flow rate of nitrogen gas was 1 liter/hr.

In operation, 80 kg of a monomer mixture of bisphenol A and diphenyl carbonate in a molar ratio of 1:1.10 was charged into each of first agitation type polymerizer vessels 303A and 303B. The monomer mixture in polymerizer 303A was polymerized in a molten state while agitating for 4 hours to obtain prepolymer 304A. Outlet 305A was opened, and prepolymer 304A was fed to second agitation type polymerizer vessel 303C at a flow rate of 5 liters/hr.

While feeding prepolymer 304A obtained in first agitation type polymerizer vessel 303A to second agitation type polymerizer vessel 303C, first agitation type polymerizer vessel 303B was operated to polymerize the monomer mixture of bisphenol A and diphenyl carbonate in the same manner as in the agitation polymerization in first agitation type polymerizer vessel 303A, to obtain prepolymer 304B.

When first agitation type polymerizer vessel 303A became empty, outlet 305A of polymerizer 303A was closed and, instead, outlet 305B of polymerizer 303B was opened, so that prepolymer 304B was fed from first agitation type polymerizer vessel 303B to second agitation type polymerizer vessel 303C at a flow rate of 5 liters/hr. In this instance, the same monomer mixture of bisphenol A and diphenyl carbonate as mentioned above was charged in polymerizer 303A. While feeding prepolymer 304B obtained in first agitation type polymerizer vessel 303B to second agitation type polymerizer vessel 303C, polymerizer vessel 303A was operated, so that the monomer mixture charged therein was polymerized in the same manner as mentioned above.

With respect to the batchwise polymerization in first agitation type polymerizer vessels 303A and 303B and to the alternate feedings of prepolymers 304A and 304B from polymerizers 303A and 303B to second agitation type polymerizer vessel 303C, the same operation as mentioned above was repeated, so that the prepolymer (either prepolymer 304A or prepolymer 304B, alternately) was continuously fed to second agitation type polymerizer vessel 303C.

In second agitation type polymerizer vessel 303C, a further agitation polymerization of prepolymers 304A and 304B, alternately fed from first agitation type polymerizer vessels 303A and 303B, was continuously carried out under polymerization reaction conditions wherein the reaction temperature was 240° C., the reaction pressure was 70 mmHg and the flow rate of nitrogen gas was 2 liters/hr, thereby obtaining prepolymer 304C.

When the volume of prepolymer 304C in second agitation type polymerizer vessel 303C reached 20 liters, part of prepolymer 304C was continuously fed to first wire-wetting fall polymerizer 110A so that the volume of prepolymer 304C in second agitation type polymerizer vessel 303C was constantly maintained at 20 liters. The feeding of prepolymer 304C to first wire-wetting fall polymerizer 110A was conducted through inlet 101A provided in recirculation line 102A for polymerizer 110A.

In first wire-wetting fall polymerizer 110A, a wire-wetting fall polymerization of prepolymer 304C was continuously carried out under polymerization reaction conditions wherein the reaction temperature was 260° C., and the reaction pressure was 4.0 mmHg, thereby obtaining prepolymer 111A, while recirculating a part of obtained prepolymer 111A to the feeding zone (having foraminous plate 103A) of first wire-wetting fall polymerizer 110A through recirculation line 102A at a recirculation rate of 80 liters/hr.

When the volume of prepolymer 111A at the bottom of first wire-wetting fall polymerizer 110A reached 10 liters, part of prepolymer 111A was continuously fed to second wire-wetting fall polymerizer 110B so that the volume of prepolymer 111A in first wire-wetting fall polymerizer 110A was constantly maintained at 10 liters.

In second wire-wetting fall polymerizer 110B, a wire-wetting fall polymerization reaction was continuously carried out under polymerization reaction conditions wherein the reaction temperature was 270° C., and the reaction pressure was 0.5 mmHg, thereby obtaining polymer 111B.

When the volume of polymer 111B at the bottom of second wire-wetting fall polymerizer 110B reached 10 liters, polymer 111B was continuously withdrawn from second wire-wetting fall polymerizer 110B through outlet 109B by means of discharge pump 108b so that the volume of polymer 111B in second wire-wetting fall polymerizer 110B was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.3, 3.2 and 3.2, respectively, and had Mn values of 8,200, 8,200 and 8,200, respectively. After completion of the series of polymerization reactions continuously conducted for 600 hours, no accumulation of low molecular weight polymer and the like was observed on the perforated plate in each of the first and second free-fall polymerizers, and the foraminous plate in each of the first and second wall-wetting fall polymerizers.

EXAMPLE 10

An aromatic polycarbonate was produced in accordance with a system as shown in FIG. 5. The system of FIG. 5 comprises an agitation polymerization, and a wire-wetting fall polymerization.

In the agitation polymerization, horizontal twin-screw agitation type polymerizer 401 was used. Horizontal twin-screw agitation type polymerizer 401 has a capacity of 30 liters, an L/D ratio of 6, and a twin-screw agitator having a rotation diameter of 140 mm.

In the wire-wetting fall polymerization, wire-wetting fall polymerizer 110 was used. First wire-wetting fall polymerizer 110 is equipped with a foraminous plate which has 20 holes having a diameter of 4 mm and arranged in a zigzag configuration. In wire-wetting fall polymerizer 110, 20 strands of 1.0 mmϕ SUS 316 wires are hung vertically from the respective holes of foraminous plate 103 to a reservoir portion at the bottom of wire-wetting fall polymerizer 110, wherein each wire is secured in the same manner as described in Example 1 and shown in FIG. 10. In wire-wetting fall polymerizer 110, the wire-wetting fall distance is 4 m.

A molten mixture of bisphenol A and diphenyl carbonate (molar ratio of 1:1.07) was continuously fed to horizontal twin-screw agitation type polymerizer 401 at 5 liters/hr, so that an agitation polymerization reaction of the molten mixture was carried out under polymerization reaction conditions wherein the reaction temperature was 230° C., and the reaction pressure was 50 mmHg, thereby obtaining a prepolymer.

When the volume of the prepolymer in horizontal twin-screw agitation type polymerizer 401 reached 15 liters, part of the prepolymer was continuously fed to wire-wetting fall polymerizer 110 so that the volume of the prepolymer in polymerizer 401 was constantly maintained at 15 liters. The feeding of the prepolymer to wire-wetting fall polymerizer 110 was conducted through inlet 101 provided in recirculation line 102 for wire-wetting fall polymerizer 110.

In wire-wetting fall polymerizer 110, a wire-wetting fall polymerization of the prepolymer obtained in horizontal twin-screw agitation type polymerizer 401 was continuously carried out under polymerization reaction conditions wherein the reaction temperature was 260° C., and the reaction pressure was 2.0 mmHg, thereby obtaining polymer 111, while recirculating a part of obtained polymer 111 to the feeding zone (having foraminous plate 103) of wire-wetting fall polymerizer 110 through recirculation line 102 at a recirculation rate of 80 liters/hr.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.3, 3.3 and 3.4, respectively, and had Mn values of 5,900, 6,000 and 6,000, respectively. After completion of the series of polymerization reactions continuously conducted for 600 hours, no accumulation of low molecular weight polymer and the like was observed on the foraminous plate in the wire-wetting fall polymerizer.

EXAMPLE 11

An aromatic polycarbonate was produced in accordance with a system as shown in FIG. 6. The system of FIG. 6 comprises a wall-wetting fall polymerization, and first stage and second stage wire-wetting fall polymerizations.

In the wall-wetting fall polymerization, wall-wetting fall polymerizer 504 was used. Wall-wetting fall polymerizer 504 had a tube having an inner wall surface area of 2 m².

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a foraminous plate which has 20 holes having a diameter of 7 mm and arranged in a zigzag configuration. In each of the first and second wire-wetting fall polymerizers, 20 strands of 1.0 mm$\phi$ SUS 316 wires are hung vertically from the respective holes of the foraminous plate to a reservoir portion at the bottom of the wire-wetting fall polymerizer, wherein each wire is secured in the same manner as described in Example 1 and shown in FIG. 10. In each of the first and second wire-wetting fall polymerizers, the wire-wetting fall distance is 8 m.

A molten mixture of bisphenol A and diphenyl carbonate (molar ratio of 1:1.03) was continuously fed through inlet 501 and recirculation line 502 at a flow rate of 3 liters/hr and introduced through overflow port 503 into the wall-wetting fall polymerization reaction zone, thereby effecting a wall-wetting fall polymerization. The introduced molten mixture fell along and in contact with the inner wall of the tube in the form of film-like prepolymer 505. The reaction conditions of the wall-wetting fall polymerization were as follows: the reaction temperature was 240° C., and the reaction pressure was 40 mmHg. A part of the resultant prepolymer 509 at the bottom of wall-wetting fall polymerizer 504 was recirculated to overflow port 503 of wall-wetting fall polymerizer 504 through recirculation line 502 at a recirculation rate of 600 liters/hr and introduced to wall-wetting fall polymerizer 504.

When the volume of prepolymer 509 at the bottom of wall-wetting fall polymerizer 504 reached 10 liters, part of prepolymer 509 was continuously fed to first wire-wetting fall polymerizer 110A so that the volume of prepolymer 509 in wall-wetting fall polymerizer 504 was constantly maintained at 10 liters. The feeding of prepolymer 509 to first wire-wetting fall polymerizer 110A was conducted through inlet 101A provided in recirculation line 102A for wire-wetting fall polymerizer 110A.

In first wire-wetting fall polymerizer 110A, a wire-wetting fall polymerization of prepolymer 509 was continuously carried out under polymerization reaction conditions wherein the reaction temperature was 250° C., and the reaction pressure was 5.0 mmHg, thereby obtaining prepolymer 111A, while recirculating a part of obtained prepolymer 111A to the feeding zone (having foraminous plate 103A) of first wire-wetting fall polymerizer 110A through recirculation line 102A at a recirculation rate of 100 liters/hr.

When the volume of prepolymer 111A at the bottom of first wire-wetting fall polymerizer 110A reached 10 liters, part of prepolymer 111A was continuously fed to second wire-wetting fall polymerizer 110B so that the volume of prepolymer 111A in first wire-wetting fall polymerizer 110A was constantly maintained at 10 liters.

In second wire-wetting fall polymerizer 110B, a wire-wetting fall polymerization reaction was continuously carried out under polymerization reaction conditions wherein the reaction temperature was 280° C., and the reaction pressure was 0.8 mmHg, thereby obtaining polymer 111B, while recirculating a part of obtained prepolymer 111B to the feeding zone (having foraminous plate 103B) of second wire-wetting fall polymerizer 110B through recirculation line 102B at a recirculation rate of 30 liters/hr.

When the volume of polymer 111B at the bottom of second wire-wetting fall polymerizer 110B reached 10 liters, polymer 111B was continuously withdrawn from second wire-wetting fall polymerizer 110B through outlet 109B by means of discharge pump 108B so that the volume of polymer 111B in second wire-wetting fall polymerizer 110B was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.2, 3.3 and 3.2, respectively, and had Mn values of 8,200, 8,200 and 8,100, respectively. After completion of the series of polymerization reactions continuously conducted for 600 hours, no accumulation of low molecular weight polymer and the like was observed on the foraminous plate in each of the first and second wire-wetting fall polymerizers.

EXAMPLE 12

An aromatic polycarbonate was produced in accordance with a system as shown in FIG. 7. The system of FIG. 7 comprises first stage and second stage agitation polymerizations, a free-fall polymerization, and a wire-wetting fall polymerization.

In the first stage agitation polymerization, a couple of first agitation type polymerizer vessels 303A and 303B were used. In the second stage agitation polymerization, second agitation type polymerizer vessel 303C was used. The capacity of each of first agitation type polymerizer vessels 303A and 303B was 100 liters, and the capacity of second agitation type polymerizer vessel 303C was 50 liters. The agitating blades of each of these three agitation type polymerizer vessels were of anchor type.

In the free-fall polymerization, free-fall polymerizer 210 was used. Free-fall polymerizer 210 is equipped with a perforated plate which has 50 holes having a diameter of 3 mm and arranged in a zigzag configuration. Free-fall polymerizer 210 had recirculation line 202. The free-fall distance is 4 m.

In the wire-wetting fall polymerization, wire-wetting fall polymerizer 110 was used. Wire-wetting fall polymerizer 110 is equipped with a foraminous plate which has 20 holes having a diameter of 5 mm and arranged in a zigzag configuration. In wire-wetting fall polymerizer 110, 20 strands of 0.8 mmφ SUS 316 wires are hung vertically from the respective holes of foraminous plate 103 to a reservoir portion at the bottom of wire-wetting fall polymerizer 110, wherein each wire is secured in the same manner as described in Example 1 and shown in FIG. 10. In wire-wetting fall polymerizer 110, the wire-wetting fall distance is 6 m.

The first stage agitation polymerization in first agitation type polymerizer vessels 303A and 303B was batchwise conducted, whereas the second stage agitation polymerization in second agitation type polymerizer vessel 303C, the free-fall polymerization in free-fall polymerizer 210, and the wire-wetting fall polymerization in wire-wetting fall polymerizer 110, were continuously conducted.

The polymerization reaction conditions in both of first agitation type polymerizer vessels 303A and 303B were as follows: the reaction temperature was 180° C., the reaction pressure was atmospheric pressure, and the flow rate of nitrogen gas was 0.5 liter/hr.

In operation, 80 kg of a monomer mixture of bisphenol A and diphenyl carbonate in a molar ratio of 1:1.05 was charged into each of first agitation type polymerizer vessels 303A and 303B. The monomer mixture in polymerizer 303A was polymerized in a molten state while agitating for 4 hours to obtain prepolymer 304A. Outlet 305A was opened, and prepolymer 304A was fed to second agitation type polymerizer vessel 303C at a flow rate of 3 liters/hr.

While feeding prepolymer 304A obtained in first agitation type polymerizer vessel 303A to second agitation type polymerizer vessel 303C, first agitation type polymerizer vessel 303B was operated and the monomer mixture of bisphenol A and diphenyl carbonate was polymerized in the same manner as in the agitation polymerization in first agitation type polymerizer vessel 303A, to obtain prepolymer 304B.

When first agitation type polymerizer vessel 303A became empty, outlet 305A of polymerizer 303A was closed and, instead, outlet 305B of polymerizer 303B was opened, so that prepolymer 304B was fed from first agitation type polymerizer vessel 303B to second agitation type polymerizer vessel 303C at a flow rate of 3 liters/hr. In this instance, the same monomer mixture of bisphenol A and diphenyl carbonate as mentioned above was charged in polymerizer 303A. While feeding prepolymer 304B obtained in first agitation type polymerizer vessel 303B to second agitation type polymerizer vessel 303C, polymerizer vessel 303A was operated, so that the monomer mixture charged therein was polymerized in the same manner as mentioned above.

With respect to the batchwise polymerization in first agitation type polymerizer vessels 303A and 303B and to the alternate feedings of prepolymers 304A and 304B from polymerizers 303A and 303B to second agitation type polymerizer vessel 303C, the same operation as mentioned above was repeated, so that the prepolymer (either prepolymer 304A or prepolymer 304B, alternately) was continuously fed to second agitation type polymerizer vessel 303C.

In second agitation type polymerizer vessel 303C, a further agitation polymerization of prepolymers 304A and 304B, alternately fed from first agitation type polymerizer vessels 303A and 303B, was continuously carried out under polymerization reaction conditions wherein the reaction temperature was 240° C., the reaction pressure was 60 mmHg and the flow rate of nitrogen gas was 1 liter/hr, thereby obtaining prepolymer 304C.

When the volume of prepolymer 304C in second agitation type polymerizer vessel 303C reached 20 liters, part of prepolymer 304C was continuously fed to free-fall polymerizer 210 so that the volume of prepolymer 304C in second agitation type polymerizer vessel 303C was constantly maintained at 20 liters. The feeding of prepolymer 304C to free-fall polymerizer 210 was conducted through inlet 201 provided in recirculation line 202 for polymerizer 210.

In free-fall polymerizer 210, a free-fall polymerization of prepolymer 304C was continuously carried out under polymerization reaction conditions wherein the reaction temperature was 250° C., and the reaction pressure was 3.0 mmHg, thereby obtaining prepolymer 211, while recirculating a part of obtained prepolymer 211 to the introduction zone (having perforated plate 203) of free-fall polymerizer 210 through recirculation line 202 at a recirculation rate of 100 liters/hr.

When the volume of prepolymer 211 at the bottom of free-fall polymerizer 210 reached 10 liters, part of prepolymer 211 was continuously fed to wire-wetting fall polymerizer 110 so that the volume of prepolymer 211 in free-fall polymerizer 210 was constantly maintained at 10 liters.

In wire-wetting fall polymerizer 110, a wire-wetting fall polymerization reaction was continuously carried out under polymerization reaction conditions wherein the reaction temperature was 280° C., and the reaction pressure was 0.4 mmHg, thereby obtaining polymer 111.

When the volume of polymer 111 at the bottom of wire-wetting fall polymerizer 110 reached 10 liters, polymer 111 was continuously withdrawn from wire-wetting fall polymerizer 110 through outlet 109 by means of discharge pump 108 so that the volume of polymer 111 in wire-wetting fall polymerizer 110 was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.3, 3.3 and 3.2, respectively, and had Mn values of 9,900, 10,000 and 10,000, respectively. After completion of the series of polymerization reactions continuously conducted for 600 hours, no accumulation of low molecular weight polymer and the like was observed on the perforated plate in the free-fall polymerizer and the foraminous plate in the wall-wetting fall polymerizer.

EXAMPLE 13

An aromatic polycarbonate was produced in accordance with a system as shown in FIG. 8. The system of FIG. 8 comprises first stage, second stage and third stage agitation polymerizations, and a wire-wetting fall polymerization.

In the first stage agitation polymerization, a couple of first agitation type polymerizer vessels 303A and 303B were used. In the second stage agitation polymerization, second agitation type polymerizer vessel 303C was used. The capacity of each of first agitation type polymerizer vessels 303A and 303B was 100 liters, and the capacity of second agitation type polymerizer vessel 303C was 50 liters. The agitating blades of each of these three agitation type polymerizer vessels were of anchor type.

In the third agitation polymerization, horizontal agitation type polymerizer 401 was used. Horizontal agitation type polymerizer 401 had a capacity of 30 liters, an L/D ratio of 6, and a twin-screw agitator having a rotation diameter of 140 mm.

In the wire-wetting fall polymerization, wire-wetting fall polymerizer 110 was used. Wire-wetting fall polymerizer 110 is equipped with a foraminous plate which has 20 holes having a diameter of 7 mm and arranged in a zigzag configuration. In wire-wetting fall polymerizer 110, 20 strands of 0.8 mm$\phi$ SUS 316 wires are hung vertically from the respective holes of foraminous plate 103 to a reservoir at the bottom of wire-wetting fall polymerizer 110, wherein each wire is secured in the same manner as described in Example 1 and shown in FIG. 10. In wire-wetting fall polymerizer 110, the fall distance is 8 m.

The first stage agitation polymerization in first agitation type polymerizer vessels 303A and 303B was batchwise conducted, whereas the second stage agitation polymerization in second agitation type polymerizer vessel 303C, the third stage agitation polymerization in horizontal agitation type polymerizer 401, and the wire-wetting fall polymerization in wire-wetting fall polymerizer 110, were continuously conducted.

The polymerization reaction conditions in both of first agitation type polymerizer vessels 303A and 303B were as follows: the reaction temperature was 180° C., the reaction pressure was atmospheric pressure, and the flow rate of nitrogen gas was 0.5 liter/hr.

In operation, 80 kg of a monomer mixture of bisphenol A and diphenyl carbonate in a molar ratio of 1:1.02 was charged into each of first agitation type polymerizer vessels 303A and 303B. The monomer mixture in polymerizer 303A was polymerized in a molten state while agitating for 4 hours to obtain prepolymer 304A. Outlet 305A was opened, and prepolymer 304A was fed to second agitation type polymerizer vessel 303C at a flow rate of 5 liters/hr.

While feeding prepolymer 304A obtained in first agitation type polymerizer vessel 303A to second agitation type polymerizer vessel 303C, first agitation type polymerizer vessel 303B was operated and the monomer mixture of bisphenol A and diphenyl carbonate was polymerized in the same manner as in the agitation polymerization in first agitation type polymerizer vessel 303A, to obtain prepolymer 304B.

When first agitation type polymerizer vessel 303A became empty, outlet 305A of polymerizer 303A was closed and, instead, outlet 305B of polymerizer 303B was opened, so that prepolymer 304B was fed from first agitation type polymerizer vessel 303B to second agitation type polymerizer vessel 303C at a flow rate of 5 liters/hr. In this instance, the same monomer mixture of bisphenol A and diphenyl carbonate as mentioned above was charged in polymerizer 303A. While feeding prepolymer 304B obtained in first agitation type polymerizer vessel 303B to second agitation type polymerizer vessel 303C, polymerizer vessel 303A was operated, so that the monomer mixture charged therein was polymerized in the same manner as mentioned above.

With respect to the batchwise polymerization in first agitation type polymerizer vessels 303A and 303B and to the alternate feeding of prepolymers 304A and 304B from polymerizers 303A and 303B to second agitation type polymerizer vessel 303C, the same operation as mentioned above was repeated, so that the prepolymer (either prepolymer 304A or prepolymer 304B, alternately) was continuously fed to second agitation type polymerizer vessel 303C.

In second agitation type polymerizer vessel 303C, a further agitation polymerization of prepolymers 304A and 304B, alternately fed from first agitation type polymerizer vessels 303A and 303B, was continuously carried out under polymerization reaction conditions wherein the reaction temperature was 240° C., the reaction pressure was 60 mmHg and the flow rate of nitrogen gas was 1 liter/hr, thereby obtaining prepolymer 304C.

When the volume of prepolymer 304C in second agitation type polymerizer vessel 303C reached 20 liters, part of prepolymer 304C was continuously fed to horizontal agitation type polymerizer 401 so that the volume of prepolymer 304C in second agitation type polymerizer vessel 303C was constantly maintained at 20 liters. The feeding of prepolymer 304C to horizontal agitation type polymerizer 401 was conducted through inlet 402 of polymerizer 401.

In horizontal agitation type polymerizer 401, an agitation polymerization of prepolymer 304C was continuously carried out under polymerization reaction conditions wherein the reaction temperature was 260° C., and the reaction pressure was 12 mmHg, thereby obtaining a prepolymer.

When the volume of the obtained prepolymer in horizontal agitation type polymerizer 401 reached 15 liters, part of the obtained prepolymer was continuously fed to wire-wetting fall polymerizer 110 so that the volume of the obtained prepolymer in horizontal agitation type polymerizer 401 was constantly maintained at 15 liters.

In wire-wetting fall polymerizer 110, a wire-wetting fall polymerization reaction was continuously carried out under polymerization reaction conditions wherein the reaction temperature was 280° C., and the reaction pressure was 0.3 mmHg, thereby obtaining polymer 111.

When the volume of polymer 111 at the bottom of wire-wetting fall polymerizer 110 reached 10 liters, polymer 111 was continuously withdrawn from wire-wetting fall polymerizer 110 through outlet 109 by means of discharge pump 108 so that the volume of polymer 111 in wire-wetting fall polymerizer 110 was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.3, 3.4 and 3.4, respectively, and Mn values of 8,100, 8,000 and 8,000, respectively. After completion of the series of polymerization reactions continuously conducted for 600 hours, no accumulation of low molecular weight polymer and the like was observed on the foraminous plate in wire-wetting fall polymerizer 110.

EXAMPLE 14

An aromatic polycarbonate was produced in accordance with a system as shown in FIG. 9. The system of FIG. 9 comprises first stage and second stage agitation polymerizations, a wall-wetting fall polymerization, and first stage and second stage wire-wetting fall polymerizations.

In the first stage agitation polymerization, a couple of first agitation type polymerizer vessels 303A and 303B were used. In the second stage agitation polymerization, second agitation type polymerizer vessel 303C was used. The capacity of each of first agitation type polymerizer vessels 303A and 303B was 100 liters, and the capacity of second agitation type polymerizer vessel 303C was 50 liters. The agitating blades of each of these three agitation type polymerizer vessels were of anchor type.

In the wall-wetting fall polymerization, wall-wetting fall polymerizer 504 was used. Wall-wetting fall polymerizer 504 had a tube having an inner wall surface area of 2 m$^2$.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a foraminous plate which has 20 holes having a diameter of 5 mm and arranged in a zigzag configuration. In each of the first and second wire-wetting fall polymerizers, 20 strands of 0.8 mm$\phi$ SUS 316 wires are hung vertically from the respective holes of the foraminous plate to a reservoir portion at the bottom of the wire-wetting fall polymerizer, wherein each wire is secured in the same manner as described in Example 1 and shown in FIG. 10. In each of the first and second wire-wetting fall polymerizers, the wire-wetting fall distance is 6 m.

The first stage agitation polymerization in first agitation type polymerizer vessels 303A and 303B was batchwise conducted, whereas the second stage agitation polymerization in second agitation type polymerizer vessel 303C, the wall-wetting fall polymerization in wall-wetting fall polymerizer 504, the first stage wire-wetting fall polymerization in first stage wire-wetting fall polymerizer 110A and the second stage wire-wetting fall polymerization in second stage wire-wetting fall polymerizer 110B were continuously conducted.

The polymerization reaction conditions in both of first agitation type polymerizer vessels 303A and 303B were as follows: the reaction temperature was 180° C., the reaction pressure was atmospheric pressure, and the flow rate of nitrogen gas was 0.5 liter/hr.

In operation, 80 kg of a monomer mixture of bisphenol A and diphenyl carbonate in a molar ratio of 1:1.05 was charged into each of first agitation type polymerizer vessels 303A and 303B. The monomer mixture in polymerizer 303A was polymerized in a molten state while agitating for 4 hours to obtain prepolymer 304A. Outlet 305A was opened, and prepolymer 304A was fed to second agitation type polymerizer vessel 303C at a flow rate of 4 liters/hr.

While feeding prepolymer 304A obtained in first agitation type polymerizer vessel 303A to second agitation type polymerizer vessel 303C, first agitation type polymerizer vessel 303B was operated and the monomer mixture of bisphenol A and diphenyl carbonate was polymerized in the same manner as in the agitation polymerization in first agitation type polymerizer vessel 303A, to obtain prepolymer 304B.

When first agitation type polymerizer vessel 303A became empty, outlet 305A of polymerizer 303A was closed and, instead, outlet 305B of polymerizer 303B was opened, so that prepolymer 304B was fed from first agitation type polymerizer vessel 303B to second agitation type polymerizer vessel 303C at a flow rate of 4 liters/hr. In this instance, the same monomer mixture of bisphenol A and diphenyl carbonate as mentioned above was charged in polymerizer 303A. While feeding prepolymer 304B obtained in first agitation type polymerizer vessel 303B to second agitation type polymerizer vessel 303C, polymerizer vessel 303A was operated, so that the monomer mixture charged therein was polymerized in the same manner as mentioned above.

With respect to the batchwise polymerization in first agitation type polymerizer vessels 303A and 303B and to the alternate feeding of prepolymers 304A and 304B from polymerizers 303A and 303B to second agitation type polymerizer vessel 303C, the same operation as mentioned above was repeated, so that the prepolymer (either prepolymer 304A or prepolymer 304B, alternately) was continuously fed to second agitation type polymerizer vessel 303C.

In second agitation type polymerizer vessel 303C, a further agitation polymerization of prepolymers 304A and 304B, alternately fed from first agitation type polymerizer vessels 303A and 303B, was continuously carried out under polymerization reaction conditions wherein the reaction temperature was 240° C., the reaction pressure was 60 mmHg and the flow rate of nitrogen gas was 1 liter/hr, thereby obtaining prepolymer 304C.

When the volume of prepolymer 304C in second agitation type polymerizer vessel 303C reached 20 liters, part of prepolymer 304C was continuously fed to wall-wetting fall polymerizer 504 so that the volume of prepolymer 304C in second agitation type polymerizer vessel 303C was constantly maintained at 20 liters. The feeding of prepolymer 304C to wall-wetting fall polymerizer 504 was conducted through inlet 501 provided in recirculation line 502 for wall-wetting fall polymerizer 504.

In wall-wetting fall polymerizer 504, a wall-wetting fall polymerization of prepolymer 304C was continuously carried out under polymerization reaction conditions wherein the reaction temperature was 250° C., and the reaction pressure was 4 mmHg, thereby obtaining prepolymer 509, while recirculating a part of obtained prepolymer 509 to overflow port 503 of wall-wetting fall polymerizer 504 through recirculation line 502 at a recirculation rate of 100 liters/hr.

When the volume of prepolymer 509 at the bottom of wall-wetting fall polymerizer 504 reached 10 liters, part of prepolymer 509 was continuously fed to first stage wire-wetting fall polymerizer 110A so that the volume of prepolymer 509 in wall-wetting fall polymerizer 504 was constantly maintained at 10 liters.

In first wire-wetting fall polymerizer 110A, a wire-wetting fall polymerization of prepolymer 509 was continuously carried out under polymerization reaction conditions wherein the reaction temperature was 260° C., and the reaction pressure was 1 mmHg, thereby obtaining prepolymer 111A, while recirculating a part of obtained prepolymer 111A to the feeding zone (having foraminous plate 103A) of first wire-wetting fall polymerizer 110A through recirculation line 102A at a recirculation rate of 20 liters/hr.

When the volume of prepolymer 111A at the bottom of first wire-wetting fall polymerizer 110A reached 10 liters, part of prepolymer 111A was continuously fed to second wire-wetting fall polymerizer 110B so that the volume of prepolymer 111A in first wire-wetting fall polymerizer 110A was constantly maintained at 10 liters.

In second wire-wetting fall polymerizer 110B, a wire-wetting fall polymerization reaction was continuously carried out under polymerization reaction conditions wherein the reaction temperature was 280° C., and the reaction pressure was 0.3 mmHg, thereby obtaining polymer 111B.

When the volume of polymer 111B at the bottom of wire-wetting fall polymerizer 110B reached 10 liters, polymer 111B was continuously withdrawn from second stage wire-wetting fall polymerizer 110B through outlet 109B by means of discharge pump 108B so that the volume of polymer 111B in second stage wire-wetting fall polymerizer 110B was constantly maintained at 10 liters.

The above-mentioned series of polymerization reactions was continuously carried out for 600 hours. Samples were taken from the produced aromatic polycarbonates which were withdrawn at time points of 200 hours, 400 hours and 600 hours after the start of the polymerization reaction. The samples of the produced aromatic polycarbonates withdrawn at time points of 200 hours, 400 hours and 600 hours after the start of the reaction had b*-values of 3.4, 3.3 and 3.3, respectively, and Mn values of 11,900, 12,000 and 12,000, respectively. After completion of the series of polymerization reactions continuously conducted for 600 hours, no accumulation of low molecular weight polymer and the like was observed on the foraminous plate in each of the first and second wire-wetting fall polymerizers.

EXAMPLES 15 to 18

In accordance with the same system as employed in Example 14 and shown in FIG. 9, a series of polymerization reactions was individually conducted in substantially the same manner as in Example 14, except that a monomer mixture of bisphenol A and an aromatic dihydroxy compound (shown in Table 2) other than bisphenol A in a molar ratio of 1:1 was used instead of the bisphenol A. In each of Examples 15 to 18, the monomer mixture was used in an equimolar amount to the bisphenol A used in Example 14. Results are shown in Table 2.

TABLE 1

|  |  | Ex. 2 | Ex. 3 | Ex. 4 | Ex. 5 |
|---|---|---|---|---|---|
| Molecular weight of prepolymer | | 7,800 | 7,000 | 9,000 | 5,000 |
| Flow rate of prepolymer | | 5 | 10 | 6 | 30 |
| Flow rate of prepolymer per hole (liter/hr) | | 0.5 | 1 | 0.6 | 3 |
| Reaction temperature (°C.) | | 250 | 265 | 280 | 250 |
| Reaction pressure (mmHg) | | 0.3 | 0.7 | 0.3 | 1.0 |
| Flow rate of nitrogen gas (liter/hr) | | 0 | 1 | 2 | 0 |
| Aromatic polycarbonates | | | | | |
| 200 hrs | Mn | 9,900 | 9,200 | 12,500 | 6,200 |
|  | b*-value | 3.3 | 3.3 | 3.3 | 3.3 |
| 400 hrs | Mn | 10,000 | 9,100 | 12,500 | 6,100 |
|  | b*-value | 3.3 | 3.3 | 3.3 | 3.2 |
| 600 hrs | Mn | 10,000 | 9,200 | 12,400 | 6,100 |
|  | b*-value | 3.3 | 3.3 | 3.3 | 3.2 |
| 800 hrs | Mn | 9,900 | 9,100 | 12,600 | 6,200 |
|  | b*-value | 3.3 | 3.3 | 3.3 | 3.3 |
| 1,000 hrs | Mn | 10,000 | 9,100 | 12,500 | 6,200 |
|  | b*-value | 3.3 | 3.3 | 3.3 | 3.3 |

TABLE 2

| | Aromatic dihydroxy compound other than bisphenol A | Aromatic polycarbonate (obtained after 600-hr polymerization reactions) | |
|---|---|---|---|
| | | b*-value | Mn |
| Ex. 15 | HO—⟨C6H4⟩—S—⟨C6H4⟩—OH | 3.3 | 10,300 |
| Ex. 16 | HO—⟨C6H4⟩—SO$_2$—⟨C6H4⟩—OH | 3.3 | 11,400 |
| Ex. 17 | HO—⟨3,5-(CH$_3$)$_2$C$_6$H$_2$⟩—C(=O)—⟨3,5-(CH$_3$)$_2$C$_6$H$_2$⟩—OH | 3.4 | 10,900 |
| Ex. 18 | HO—⟨3,5-(CH$_3$)$_2$C$_6$H$_2$⟩—CH$_2$—⟨3,5-(CH$_3$)$_2$C$_6$H$_2$⟩—OH | 3.4 | 12,100 |

We claim:

1. A method for producing an aromatic polycarbonate, which comprises:

feeding, to a feeding zone having a foraminous plate, at least one polymerizing material selected from the group consisting of:
  a molten monomer mixture of an aromatic dihydroxy compound and a diaryl carbonate, and
  a molten prepolymer obtained by a process comprising reacting an aromatic dihydroxy compound with a diaryl carbonate, said foraminous plate having at least one hole, said feeding zone communicating, through said at least one hole, with a polymerization zone comprising a wire-wetting fall polymerization reaction zone, said wire-wetting fall polymerization reaction zone having at least one wire in correspondence with said at least one hole, said at least one wire being securely held at one end thereof in an upper end portion of said wire-wetting fall polymerization reaction zone and extending downwardly through said wire-wetting fall polymerization reaction zone, so that said polymerizing material fed to the feeding zone is enabled to pass downwardly through said foraminous plate and fall along and in contact with said at least one wire toward the other end of said at least one wire, and allowing said polymerizing material to pass downwardly through said foraminous plate and fall along and in contact with said at least one wire through a wire-wetting fall polymerization reaction zone, to effect a wire-wetting fall polymerization of said polymerizing material, thereby obtaining a polymer at a bottom of said polymerization zone comprising said wire-wetting fall polymerization reaction zone.

2. A method according to claim 1, which further comprises recirculating, to said feeding zone having the foraminous plate, a part or all of said polymer obtained at the bottom of said polymerization zone, and allowing the recirculated polymer to pass downwardly through said foraminous plate and fall along and in contact with said at least one wire through said wire-wetting fall polymerization reaction zone, thereby increasing the degree of polymerization of said recirculated polymer to a predetermined level.

3. A method according to claim 1, wherein the feeding of the polymerizing material to said feeding zone having the foraminous plate is continuously conducted, and which method further comprises continuously conducting a sequence of steps of recirculating, to said feeding zone having the foraminous plate, a part of said polymer obtained at the bottom of said polymerization zone, and allowing an admixture of the continuously fed polymerizing material and the recirculated polymer to pass downwardly through said foraminous plate and fall along and in contact with said at least one wire through said wire-wetting fall polymerization reaction zone, thereby continuously effecting a wire-wetting fall polymerization of said admixture, while continuously withdrawing the remainder of said polymer obtained at the bottom of said polymerization zone.

4. A method according to claim 1, wherein said polymerizing material is the molten prepolymer.

5. A method according to claim 4, wherein said molten prepolymer is a molten second prepolymer which has been obtained by a process selected from the group consisting of:
  (a) a free-fall polymerization process comprising introducing, to an introduction zone having a perforated plate, at least one starting material selected from the group consisting of:
    a monomer mixture of an aromatic dihydroxy compound and a diaryl carbonate, and
    a first prepolymer obtained by reacting an aromatic dihydroxy compound with a diaryl carbonate, and
    allowing said starting material to pass downwardly through said perforated plate and fall freely through a free-fall polymerization reaction zone, thereby effecting a free-fall polymerization of said starting material during the free-fall thereof,
  (b) an agitation polymerization process comprising agitating at least one starting material in a molten state in an agitation type polymerizer vessel, wherein said starting material is as defined above, thereby effecting an agitation polymerization of said starting material, and
  (c) a thin film-state polymerization process comprising subjecting at least one starting material in a molten state to a thin film-forming treatment to form a thin film of said starting material, wherein said starting material is as defined above, thereby effecting a thin film-state polymerization of said starting material while allowing said thin film to maintain a thin film-state thereof, and
  wherein said molten second prepolymer as the polymerizing material is subjected to said wire-wetting fall polymerization to obtain said polymer at the bottom of said polymerization zone.

6. A method according to claim 5, which further comprises recirculating to said feeding zone a part or all of said polymer obtained at the bottom of said polymerization zone, and allowing said recirculated polymer to pass downwardly through said foraminous plate and fall along and in contact with said at least one wire through said wire-wetting fall polymerization reaction zone, thereby increasing the degree of polymerization of said recirculated polymer to a predetermined level.

7. A method according to claim 5, wherein, in said wire-wetting fall polymerization of said second prepolymer, the feeding of the second prepolymer to said feeding zone having the foraminous plate is continuously conducted, and which method further comprises continuously conducting a sequence of steps of recirculating to said feeding zone a part of the polymer obtained at the bottom of said polymerization zone, and allowing an admixture of the continuously fed second prepolymer in the molten state and the recirculated polymer to pass downwardly through said foraminous plate and fall along and in contact with said at least one wire through said wire-wetting fall polymerization reaction zone, thereby continuously effecting a wire-wetting fall polymerization of said admixture, while continuously withdrawing the remainder of said polymer obtained at the bottom of said polymerization zone.

8. A method according to claim 4, wherein said molten prepolymer is a molten third prepolymer which has been obtained by a process selected from the group consisting of:
  (d) an agitation and free-fall polymerization process comprising:
    agitating a starting material in a molten state in an agitation type polymerizer vessel, said starting material being at least one member selected from the group consisting of:
      a monomer mixture of an aromatic dihydroxy compound and a diaryl carbonate, and
      a first prepolymer obtained by reacting an aromatic dihydroxy compound with a diaryl carbonate,
    thereby effecting an agitation polymerization of said starting material to obtain a second prepolymer; and
    introducing said second prepolymer in a molten state to an introduction zone having a perforated plate, and allowing said second prepolymer to pass downwardly through said perforated plate and fall freely through a free-fall polymerization reaction zone, thereby effecting a free-fall polymerization of said second prepolymer during the free-fall thereof, and
  (e) an agitation and thin film-state polymerization process comprising:
    agitating a starting material in a molten state in an agitation type polymerizer vessel, wherein said starting material is as defined above, thereby effecting an agitation polymerization of said starting material to obtain a second prepolymer; and
    subjecting said second prepolymer in a molten state to a thin film-forming treatment to form a thin film of said starting material, wherein said starting material is as defined above, thereby effecting a thin film-state polymerization of said second prepolymer while allowing said thin film to maintain a thin film state thereof, and
  wherein said molten third prepolymer as the polymerizing material is subjected to said wire-wetting fall polymerization to obtain said polymer at the bottom of said polymerization zone.

9. A method according to claim 8, which further comprises recirculating to said feeding zone a part or all of said polymer obtained at the bottom of said polymerization zone, and allowing said recirculated polymer to pass downwardly through said foraminous plate and fall along and in contact with said at least one wire through said wire-wetting fall polymerization reaction zone, thereby increasing the degree of polymerization of said recirculated polymer to a predetermined level.

10. A method according to claim 8, wherein, in said wire-wetting fall polymerization of said third prepolymer, the feeding of the third prepolymer to said feeding zone having the foraminous plate is continuously conducted, and which method further comprises continuously conducting a sequence of steps of recirculating to said feeding zone a part of the polymer obtained at the bottom of said polymerization zone, and allowing an admixture of the continuously fed third prepolymer in the molten state and the recirculated polymer to pass downwardly through said foraminous plate and fall along and in contact with said at least one wire through said wire-wetting fall polymerization reaction zone, thereby continuously effecting a wire-wetting fall polymerization of said admixture, while continuously withdrawing the remainder of said polymer obtained at the bottom of said polymerization zone.

11. A method according to claim 5, wherein said agitation polymerization of said starting material is effected using at least one member selected from the group consisting of a vertical agitation type polymerizer vessel having agitating elements rotating on a vertically extending axis and a horizontal agitation type polymerizer vessel having agitating elements rotating on a horizontally extending axis.

12. A method according to claim 11, wherein said agitation polymerization of said starting material is effected using both of said vertical agitation type polymerizer vessel and said horizontal agitation type polymerizer vessel in this order.

13. A method according to claim 1, wherein said wire-wetting fall is conducted through a distance of 0.3 m or more.

14. A method according to claim 1, wherein said polymerizing material is allowed to pass downwardly through said foraminous plate at a flow rate in the range of from $10^{-2}$ to $10^2$ liters/hr per hole.

15. A method according to claim 13, wherein said polymerizing material is allowed to pass downwardly through said foraminous plate at a flow rate in the range of from $10^{-2}$ to $10^2$ liters/hr per hole.

16. A method according to claim 1, wherein said polymerization zone comprising said wire-wetting fall polymerization reaction zone further comprises a free-fall polymerization reaction zone on at least one side selected from an upstream side and a downstream side relative to said wire-wetting fall polymerization reaction zone in contiguous relationship.

* * * * *

UNITED STATES PATENT AND TRADEMARK OFFICE
CERTIFICATE OF CORRECTION

PATENT NO. : 5,589,564
DATED : Dec. 31, 1996
INVENTOR(S) : Kyosuke KOMIYA

It is certified that error appears in the above-identified patent and that said Letters Patent is hereby corrected as shown below:

On the title page, under item [63], insert -- PCT/JP94/01202, PCT Filed Jul. 21, 1994 --.

Signed and Sealed this

Fourteenth Day of October, 1997

Attest:

BRUCE LEHMAN

*Attesting Officer*  *Commissioner of Patents and Trademarks*